(12) United States Patent
Vorwaller et al.

(10) Patent No.: US 12,502,847 B2
(45) Date of Patent: Dec. 23, 2025

(54) PULL-THROUGH WINDING SYSTEM AND METHOD

(71) Applicant: IsoTruss, Inc., Springville, UT (US)

(72) Inventors: Evanston Vorwaller, Santaquin, UT (US); Luke Hoose, Orem, UT (US); Christopher Bailey, Orem, UT (US); Justin Ward, Mapleton, UT (US); Kaal Glazier, Springville, UT (US); Juan Ruiz, Santaquin, UT (US); Marianne Clayton, Mountlake Terrace, WA (US)

(73) Assignee: IsoTruss, Inc., Springville, UT (US)

( * ) Notice: Subject to any disclaimer, the term of this patent is extended or adjusted under 35 U.S.C. 154(b) by 44 days.

(21) Appl. No.: 18/496,538

(22) Filed: Oct. 27, 2023

(65) Prior Publication Data
US 2024/0140051 A1 May 2, 2024

Related U.S. Application Data

(60) Provisional application No. 63/381,478, filed on Oct. 28, 2022.

(51) Int. Cl.
*B29C 33/76* (2006.01)
*B29C 33/42* (2006.01)
(Continued)

(52) U.S. Cl.
CPC .............. *B29C 70/32* (2013.01); *B29C 33/42* (2013.01); *B29C 33/76* (2013.01); *B29C 53/821* (2013.01);
(Continued)

(58) Field of Classification Search
CPC ......... B29C 70/24; B29C 70/32; B29C 33/42; B29C 33/76; B29C 53/821; B29C 53/824; B29C 53/825; D04C 3/48
See application file for complete search history.

(56) References Cited

U.S. PATENT DOCUMENTS

| 3,645,833 A | * | 2/1972 | Figge | B29D 28/005 |
| | | | | 156/169 |
| 4,137,354 A | * | 1/1979 | Mayes, Jr. | B29C 70/382 |
| | | | | 428/36.1 |

(Continued)

FOREIGN PATENT DOCUMENTS

WO    WO-2018229437 A1 * 12/2018    .............. B29C 70/32

OTHER PUBLICATIONS

English translation of WO2018229437 (Year: 2018).*

*Primary Examiner* — Scott W Dodds
(74) *Attorney, Agent, or Firm* — Brake Hughes Bellermann LLP

(57) ABSTRACT

Systems and methods are directed to a pull-through winding method, and a manufacturing fixture, or mandrel, that guides the layup of material in the pull-through winding method, for fabrication of a three-dimensional load bearing structure. These systems and methods allow fibers of material of the 3D load bearing structure to be pulled as straight as possible during winding, and maintained as straight as possible during curing, to take full advantage of properties associated with the fiber or filament-based materials used in these structures, including, for example, carbon fiber material. The manufacturing fixture includes a plurality of pull-through slots at end portions thereof, that provide for the pulling of the fiber-based material, and the application and maintenance of tension in the material that maintains the alignment of the fibers as the material is wound, cured and hardened.

10 Claims, 15 Drawing Sheets

(51) Int. Cl.
*B29C 53/82* (2006.01)
*B29C 70/32* (2006.01)
*B29C 70/54* (2006.01)
*B65H 54/12* (2006.01)
*B29K 63/00* (2006.01)
*B29K 105/10* (2006.01)
*B29K 307/04* (2006.01)

(52) U.S. Cl.
CPC ........... *B29C 70/543* (2013.01); *B65H 54/12* (2013.01); *B29K 2063/00* (2013.01); *B29K 2105/103* (2013.01); *B29K 2307/04* (2013.01); *B65H 2701/314* (2013.01)

(56) References Cited

U.S. PATENT DOCUMENTS

| | | | | |
|---|---|---|---|---|
| 4,366,658 | A * | 1/1983 | Maistre | B29C 70/24 |
| | | | | 52/223.3 |
| 4,391,594 | A * | 7/1983 | Hannibal | F16D 3/725 |
| | | | | 464/80 |
| 5,200,251 | A * | 4/1993 | Brand | B29D 99/0014 |
| | | | | 52/630 |
| 6,149,851 | A * | 11/2000 | Deckers | B29D 28/005 |
| | | | | 425/389 |
| 7,132,027 | B2 * | 11/2006 | Jensen | D04C 3/48 |
| | | | | 156/169 |
| 8,313,600 | B2 * | 11/2012 | Wilson | G06F 3/0421 |
| | | | | 156/169 |
| 2010/0075074 | A1 * | 3/2010 | Wilson | B29C 53/821 |
| | | | | 425/441 |

* cited by examiner

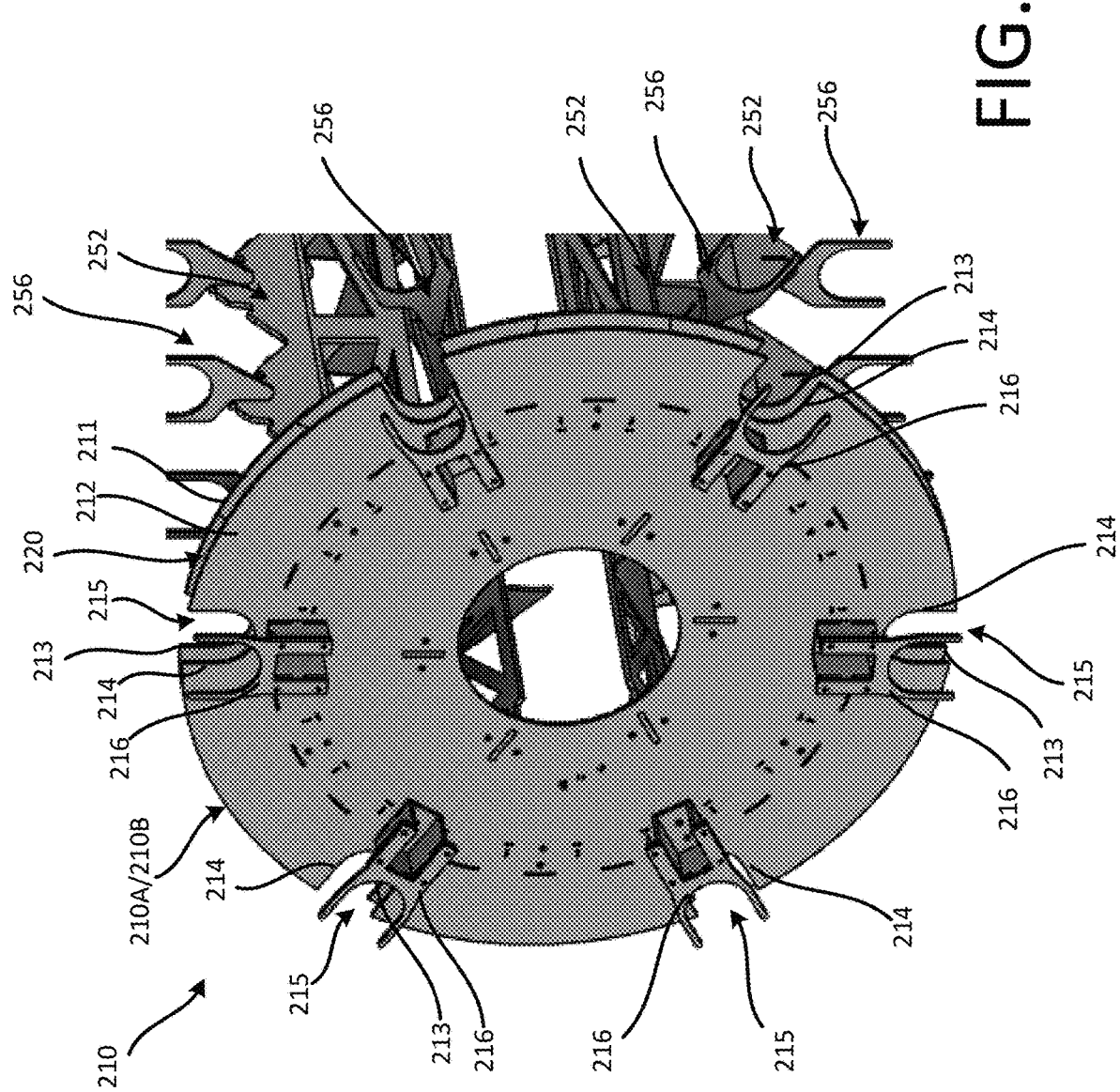

PULL-THROUGH WINDING SYSTEM AND METHOD

CROSS-REFERENCE TO RELATED APPLICATIONS

This application claims priority to U.S. Provisional Application No. 63/381,478, filed on Oct. 28, 2022, entitled "PULL-THROUGH TRUSS WINDING," the disclosure of which is incorporated herein in its entirety.

FIELD

This document relates, generally, to iso-truss structures and/or iso-grid structures and/or iso-beam structures, and in particular winding systems and methods for iso-truss structures and/or iso-grid structures and/or iso-beam structures.

BACKGROUND

Three-dimensional load bearing structures can include a plurality of load bearing members, or force members, that are joined together to define the load bearing structure. In some examples, three-dimensional load bearing structures have a lattice form or configuration, with the plurality of load bearing members being arranged to provide a relatively high load bearing capacity across a relatively extensive span.

SUMMARY

In some aspects, the techniques described herein relate to a manufacturing fixture, including: a first guide flange; a second guide flange; and an intermediate guide section between the first guide flange and the second guide flange, wherein at least one of the first guide flange or the second guide flange includes: an inner plate including a first plurality of slots formed in a peripheral portion of the inner plate; an outer plate including a second plurality of slots formed in a peripheral portion of the outer plate, at positions respectively corresponding to the first plurality of slots formed in the inner plate; and a groove defined between the inner plate and the outer plate, and the intermediate guide section includes: a plurality of support members extending between the inner plate of the first guide flange and the inner plate of the second guide flange; and a plurality of guide pins coupled on each of the plurality of support members.

In some aspects, the techniques described herein relate to a manufacturing fixture, wherein the plurality of support members is oriented in parallel with a longitudinal centerline of the manufacturing fixture; and the plurality of guide pins extends radially outward from the plurality of support members.

In some aspects, the techniques described herein relate to a manufacturing fixture, wherein each of the plurality of support members has a first end portion thereof aligned with a slot of the first plurality of slots of the first guide flange, and a second end portion thereof aligned with a corresponding slot of the second plurality of slots of the second guide flange.

In some aspects, the techniques described herein relate to a manufacturing fixture, wherein the plurality of guide pins is configured to guide a pulling of material from an outside of one the first guide flange or the second guide flange, between the slot of the first guide flange and the corresponding slot of the second guide flange.

In some aspects, the techniques described herein relate to a manufacturing fixture, further including a plurality of hooks coupled to an outward facing surface of the outer plate, at positions respectively corresponding to the first plurality of slots formed in the inner plate and the second plurality of slots formed in the outer plate.

In some aspects, the techniques described herein relate to a manufacturing fixture, wherein the plurality of hooks are spaced apart from the outward facing surface of the outer plate, so as to guide material between one of the second plurality of slots of the outer plate and another of the second plurality of slots of the outer plate, along the outward facing surface of the outer plate.

In some aspects, the techniques described herein relate to a manufacturing fixture, further including a core portion extending through a central portion of the manufacturing fixture, aligned with a central longitudinal axis of the manufacturing fixture, wherein the core portion is configured to be coupled to a support fixture that provides for rotation of the manufacturing fixture about the central longitudinal axis.

In some aspects, the techniques described herein relate to a manufacturing fixture, wherein the plurality of support members and the plurality of guide pins are positioned so as to correspond to a plurality of longitudinal members of a three-dimensional load bearing structure.

In some aspects, the techniques described herein relate to a manufacturing fixture, wherein a contour of the groove formed in the at least one of the first guide flange or the second guide flange corresponds to an axial band of a three-dimensional load bearing structure.

In some aspects, the techniques described herein relate to a manufacturing fixture, wherein at least one of the first guide flange or the second guide flange is configured to receive a plurality of windings of material into and out of the groove via the first plurality of slots and the second plurality of slots.

In some aspects, the techniques described herein relate to a method of fabricating a three-dimensional load bearing structure, the method including: winding a material between a first guide flange and a second guide flange of a manufacturing fixture, including: pulling the material from the first guide flange, along an intermediate guide section of the manufacturing fixture, through a first slot of a plurality of slots formed in the second guide flange to an outside of the second guide flange; pulling the material across the outside of the second guide flange and through a second slot of the plurality of slots formed in the second guide flange; pulling the material from the second slot formed in the second guide flange, across the intermediate guide section, through a first slot of a plurality of slots formed in the first guide flange, to an outside of the first guide flange; pulling the material across the outside of the first guide flange and through a second slot of the plurality of slots formed in the first guide flange; pulling the material from the second slot formed in the first guide flange, across the intermediate guide section to the second guide flange; and repeatedly performing the pulling of the material between the first guide flange and the second guide flange, alternating slots of the plurality of slots of the first guide flange and the plurality of slots of the second guide flange, until a set number of windings is completed; applying a pressure force to the material wound on the manufacturing fixture; and heating the material wound on the manufacturing fixture.

In some aspects, the techniques described herein relate to a method, wherein pulling the material along the intermediate guide section between the first guide flange and the second guide flange includes forming a plurality of longitudinal members of the three-dimensional load bearing structure, including winding the material along a plurality of support members extending between the first guide flange and the second guide flange to form longitudinal members extending between the first guide flange and the second guide flange.

In some aspects, the techniques described herein relate to a method, wherein pulling the material along the intermediate guide section between the first guide flange and the second guide flange includes forming a plurality of helical structures of the three-dimensional load bearing structure, including winding the material around the plurality of support members in a helical pattern between the first guide flange and the second guide flange.

In some aspects, the techniques described herein relate to a method, wherein pulling the material along the intermediate guide section includes alternating the forming of the plurality of longitudinal members and the plurality of helical structures of the three-dimensional load bearing structure.

In some aspects, the techniques described herein relate to a method, further including: forming a first band of the three-dimensional load bearing structure, including pulling the material into a circumferential groove formed between an inner plate and an outer plate of the first guide flange from one of the plurality of slots formed in the first guide flange, and out of the circumferential groove through another of the plurality of slots formed in the first band; and forming a second band of the three-dimensional load bearing structure, including pulling the material into a circumferential groove formed between an inner plate and an outer plate of the second guide flange from one of the plurality of slots formed in the second guide flange, and out of the circumferential groove through another of the plurality of slots formed in the second band.

In some aspects, the techniques described herein relate to a method, further including alternating the forming of the plurality of longitudinal members, the plurality of helical structures, the first band and the second band of the three-dimensional load bearing structure In some aspects, the techniques described herein relate to a method, wherein pulling the material across the outside of the second guide flange includes pulling the material from the first slot to the second slot of the second guide flange, the second slot being separated from the first slot by at least one other slot of the plurality of slots of the second guide flange; and pulling the material across the outside of the first guide flange includes pulling the material from the first slot to the second slot of the first guide flange, the second slot being separated from the first slot by at least one other slot of the plurality of slots of the first guide flange.

BRIEF DESCRIPTION OF THE DRAWINGS

FIG. 2F is a perspective end view of the example pull-through manufacturing fixture shown in FIGS. 2A-2E, with the core portion of the example pull-through manufacturing fixture removed.

DETAILED DESCRIPTION

Figure 1A:
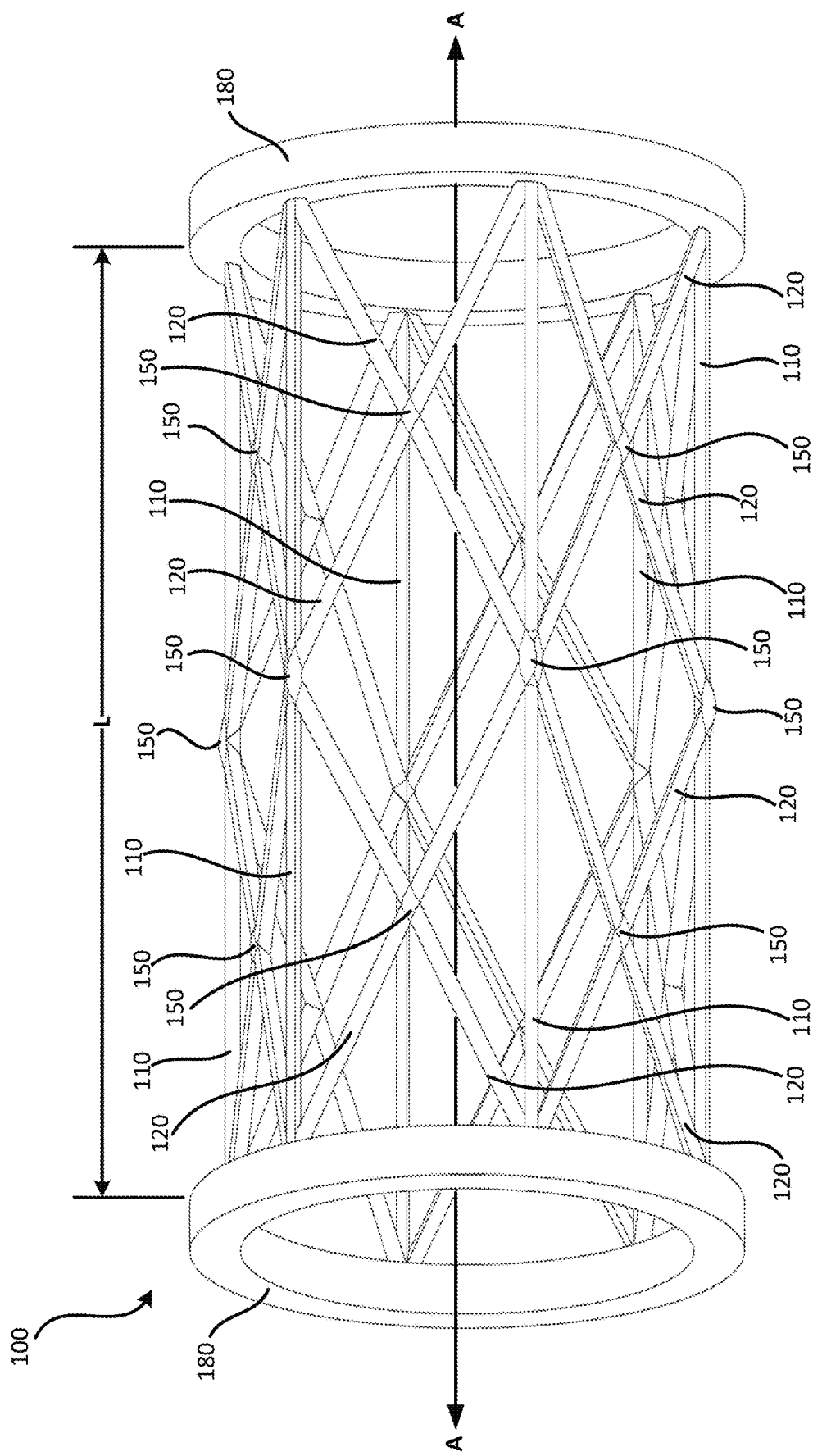
FIG. 1A is a side view of an example three-dimensional load bearing structure.

A three-dimensional (3D) load bearing structure can incorporate a lattice structure in the form of, for example, an iso-truss structure and/or an iso-grid structure and/or an iso-beam structure. In some examples, the 3D load bearing structure includes a plurality of load bearing members joined at a plurality of nodes. In some examples, the plurality of load bearing members are arranged so that the plurality of load bearing members act together, as a single load bearing structure. In some examples, the plurality of load bearing members are arranged, and joined at the plurality of nodes, so that the plurality of load bearing members and nodes are positioned in multiple different planes, defining a geometry of the 3D load bearing structure. In some examples, the plurality of load bearing members includes a plurality of longitudinal members that provide for axial and/or compressive and/or bending strength of the 3D load bearing structure. In some examples, the plurality of load bearing members includes a plurality of transverse members that carry shear and torsional forces applied to the 3D load bearing structure.

In particular, in some examples, such a 3D load bearing structure includes a plurality of longitudinal members extending along a longitudinal length of the 3D load bearing structure, arranged in parallel with a longitudinal centerline of the 3D load bearing structure. A plurality of transverse members extend between the longitudinal members. In some examples, the plurality of transverse members are arranged end to end to define polyhedral structures that extend along the longitudinal length of the 3D load bearing structure in a helical pattern. In some examples, portions of the transverse members are respectively joined to the longitudinal members at a plurality of nodes, to form a lattice type truss structure. In some examples, the plurality of longitudinal members and the plurality of transverse members are formed of a composite material. In some examples, the material of the plurality of longitudinal members and/or the material of the plurality of transverse members is a carbon fiber material. In some examples, the carbon fiber materials includes a plurality of carbon fibers, or strands, impregnated with a resin or epoxy material. In some examples, the material of the plurality of longitudinal members and/or the material of the plurality of transverse members incorporates other types of materials, including, for example, glass type materials, basalt type materials, Kevlar type materials, and other such materials. In some examples, the plurality of fibers, or strands, are interwoven, particularly at the nodes, to join the longitudinal members and the transverse members. This interweaving at the nodes provides for structural integration of the longitudinal members and the transverse members, such that the plurality of load bearing members of the 3D load bearing structure are integrally formed.

Systems and methods, in accordance with implementations described herein, are directed to a pull-through winding method, and a manufacturing fixture, or mandrel, configured to guide the layup of material in the pull-through winding method. Systems and methods, in accordance with implementations described herein, can be used to produce, for example, a high quality, strong 3D load bearing structure. In some examples, pull-through winding methods and associated manufacturing fixtures, or mandrels, allow the fibers of the material of the 3D load bearing structure to be pulled as straight as possible during winding, and maintained as straight as possible during curing, to take full advantage of properties associated with the composite materials including, for example, carbon fiber material. In some situations, the performance of the 3D load bearing structure can depend (e.g., can heavily depend) on the keeping the fibers taut and/or straight during the curing process, where the material is hardened. That is, the pull-through winding method and associated manufacturing fixtures produce load bearing members that are straighter and, therefore, better able to withstand loading. For example, the strength of a section of the 3D load bearing structure having the lattice structure, or isotruss structure, can be increased by, for example, 175% with the pull-through winding process described herein. In some examples, the pull-through winding process and associated manufacturing fixtures facilitate the application of proper tension on the fiber material by technicians during winding, which provides more consistent results and increased structural strength.

Figure 1B:
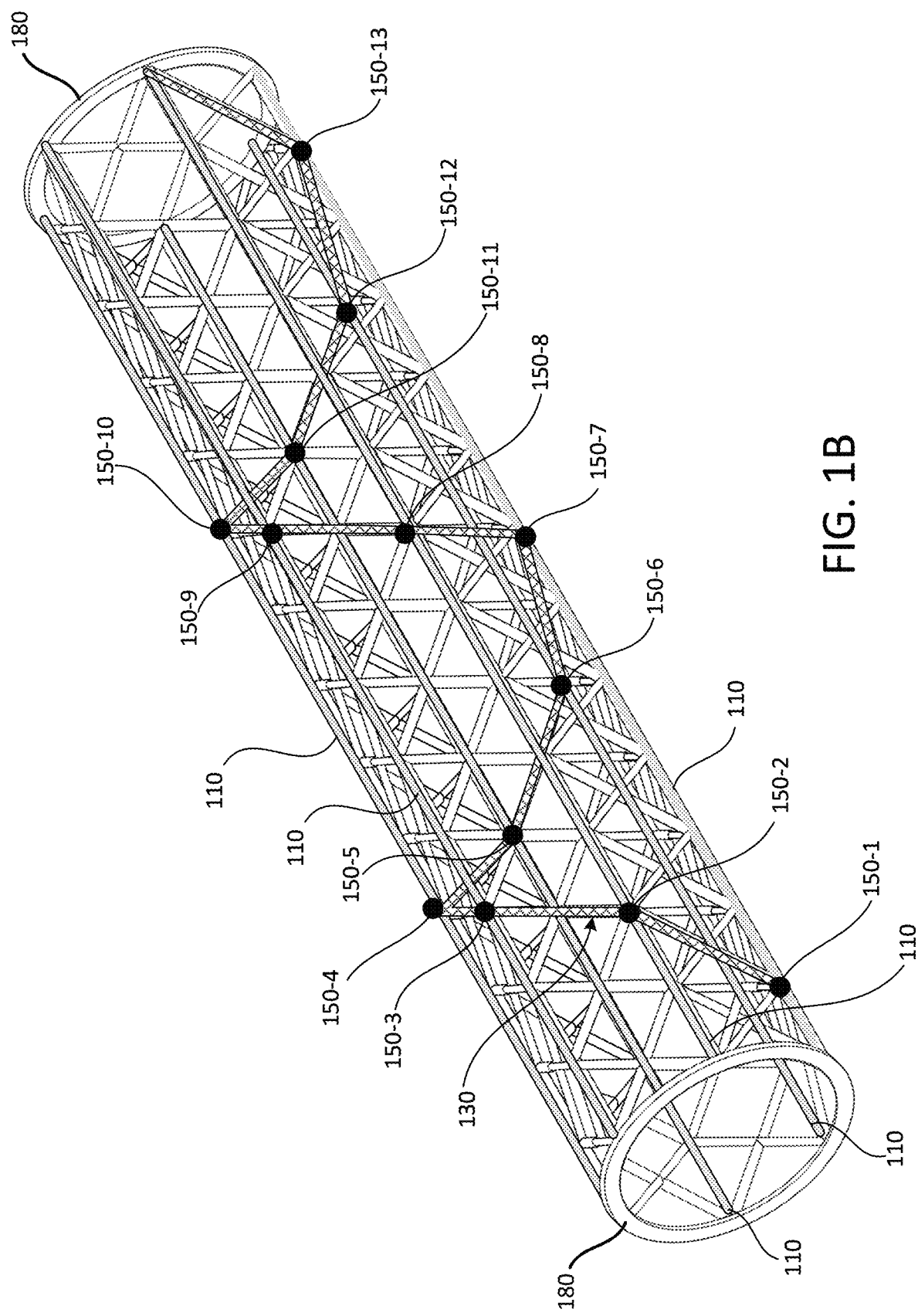
FIG. 1B is a perspective view of the example three-dimensional load bearing structure shown in FIG. 1A.

An example 3D load bearing structure 100, in the form of a lattice structure, or an isotruss structure, in accordance with implementations described herein, is shown in FIGS. 1A and 1B. In particular, FIG. 1A is a side view, and FIG. 1B is a perspective view of the example 3D load bearing structure 100. The example 3D load bearing structure 100 shown in FIGS. 1A and 1B is illustrated in a substantially horizontal orientation, with a central longitudinal axis A of the example 3D load bearing structure 100 extending substantially horizontally, simply for purposes of discussion and illustration. The principles to be described herein are applicable to a plurality of other orientations of the example 3D load bearing structure 100.

In the example shown in FIGS. 1A and 1B, the 3D load bearing structure 100 includes a plurality of longitudinal members 110 extending axially, along a length L of the 3D load bearing structure 100. A longitudinal frame portion of the 3D load bearing structure defined by the plurality of longitudinal members 110 carries an axial load portion of a force exerted on, or a load borne by the 3D load bearing structure 100. The example 3D load bearing structure 100 shown in FIGS. 1A and 1B includes six longitudinal members 110, simply for purposes of discussion and illustration. The principles described herein are applicable to 3D load bearing structures including more, or fewer, longitudinal members 110. Numerous factors affect the number of longitudinal members 110 included in the 3D load bearing structure 100 including, for example, a length of the 3D load bearing structure 100, a load to be carried by the 3D load bearing structure 100 (including, for example, an amount of torsional loading, an amount of bending loading, an amount of tension/compression loading, and other such loads which may be applied to the 3D load bearing structure 100), and the like.

In the example shown in FIGS. 1A and 1B, the plurality of longitudinal members 110 defining the longitudinal frame portion of the 3D load bearing structure 100 are arranged in parallel to each other, in parallel with the central longitudinal axis A of the 3D load bearing structure 100, and symmetrically about any one of a plurality of different central planes extending through the central longitudinal axis A.

In this example arrangement, the longitudinal members 110 carry an axial, or compressive, or bending load applied to the 3D load bearing structure 100. The example 3D load bearing structure 100 includes a plurality of polyhedral structures coupled to the longitudinal members 110 to provide reinforcement and buckling resistance to the longitudinal members 110. In the example arrangement shown in FIGS. 1A and 1B, the polyhedral structures follow a substantially helical pattern relative to the arrangement of longitudinal members 110. Hereinafter, the polyhedral structures will be referred to as helical structures 130, one of which is highlighted in FIG. 1B, joined with the longitudinal members 110 at example nodes 150-1 through 150-13 along the length L of the 3D load bearing structure 10. Each of the plurality of helical structures 130 is defined by a plurality of transverse members 120 arranged end to end. The plurality of helical structures 130 are coupled to the longitudinal members 110 at a plurality of nodes 150 to reinforce and/or to provide buckling resistance to the longitudinal members 110. In some situations, and/or in some arrangements of the components of the 3D load bearing structure 100, the helical structures 130 carry a torsional component of the load applied to the 3D load bearing structure 100.

In the example arrangement shown in FIGS. 1A and 1B, the helical structures 130 are joined (at the nodes 150) to the longitudinal members 110 at portions of the helical structures 130 where a contour of the helical structure 130 changes direction, for example, a point at which one transverse member 120 is joined to the next adjacent transverse member 120, causing the contour of the helical structure 130 to form an apex and change direction. In this arrangement, straight portions of the helical structures 130/transvers members 120 extend between adjacent longitudinal members 110, and between adjacent nodes 150. In the example shown in FIGS. 1A and 1B, this results in a 3D load bearing structure 100 having a substantially hexagonal cross-sectional shape or contour when viewed axially. More, or fewer, longitudinal members 110 would produce a 3D load bearing structure having a different cross-sectional shape or contour. In some implementations, the longitudinal members 110 and the helical structures 130/transverse members 120 may be joined at straight portions of the transverse members 120, such that the nodes 150 occur at straight portions of the corresponding helical structure 130/an intermediate portion of the transverse members 120.

In some examples, a band 180 is formed (e.g., attached, integrally formed) at each axial end of the 3D load bearing structure 100. In some examples, the band 180 facilitates the connection of the 3D load bearing structure 100 to an adjacent load bearing structure (not shown). In some examples, the band facilitates the connection of the 3D load bearing structure 100 to another structural support element, such as a building, a mounting platform, and the like. In the example shown in FIGS. 1A and 1B, the band 180 is substantially circular, simply for purposes of discussion and illustration. The principles described herein are applicable to 3D load bearing structures including bands having other forms and/or shapes and/or contours.

As described above, the 3D load bearing structure 100 including the plurality of longitudinal members 110, the transverse members 120 defining the helical structures 130, and the bands 180 may be integrally formed of a composite material such as a carbon fiber material, or other type of material, including a plurality of strands or fibers of material impregnated in a resin or epoxy material. In some examples, this arrangement of the strands of the material forming the longitudinal members 110, the strands of the material forming the helical structures 130, and the strands of the material forming the bands 180, may be guided by features of a manufacturing fixture, or a manufacturing jig, or a mandrel. The completed layup of the pre-impregnated carbon fiber material on the manufacturing fixture is cured/hardened to produce the example 3D load bearing structure 100. In some examples, the material arranged on the manufacturing fixture is compressed or compacted, to facilitate the reduction and/or elimination of voids in the material prior to curing/hardening.

As described above, features such as, for example, longitudinal length L, number of longitudinal members 110 (and resulting cross-sectional shape of the 3D load bearing structure), distances between adjacent nodes 150, materials, and the like may be varied based on, for example, a load to be borne, installation environment, and other such factors. The 3D load bearing structure 100 can garner a considerable increase in strength (compared to, for example a similar structure made of a solid metal material and/or tubing) from the material used for the longitudinal members 110 and/or the helical structures 130/transverse members 120, alone or in combination with the geometric configuration defined by their truss or lattice type arrangement. Systems and methods related to a pull-through winding process, in accordance with implementations described herein, can have significant performance and quality advantages over other winding processes in maintaining a straight alignment of the fibers of material (e.g., aligned along a line) during the pull-through winding process. Alignment of the fibers of material in this manner produces considerably greater strength in the finished product. In some situations, bends or crimps or areas of reduced tension in the strands of the material may introduce a potential point of reduced strength, or a potential point of failure. Thus, the pull-through winding process and associated manufacturing fixture, in accordance with implementations described herein, facilitate the application and maintenance of consistent tension during the material winding process, the layup of straight, aligned of fibers of the material, and the maintenance of that straight alignment of the fibers as the 3D load bearing structure 100 is compacted and/or cured/hardened.

Figure 1C:
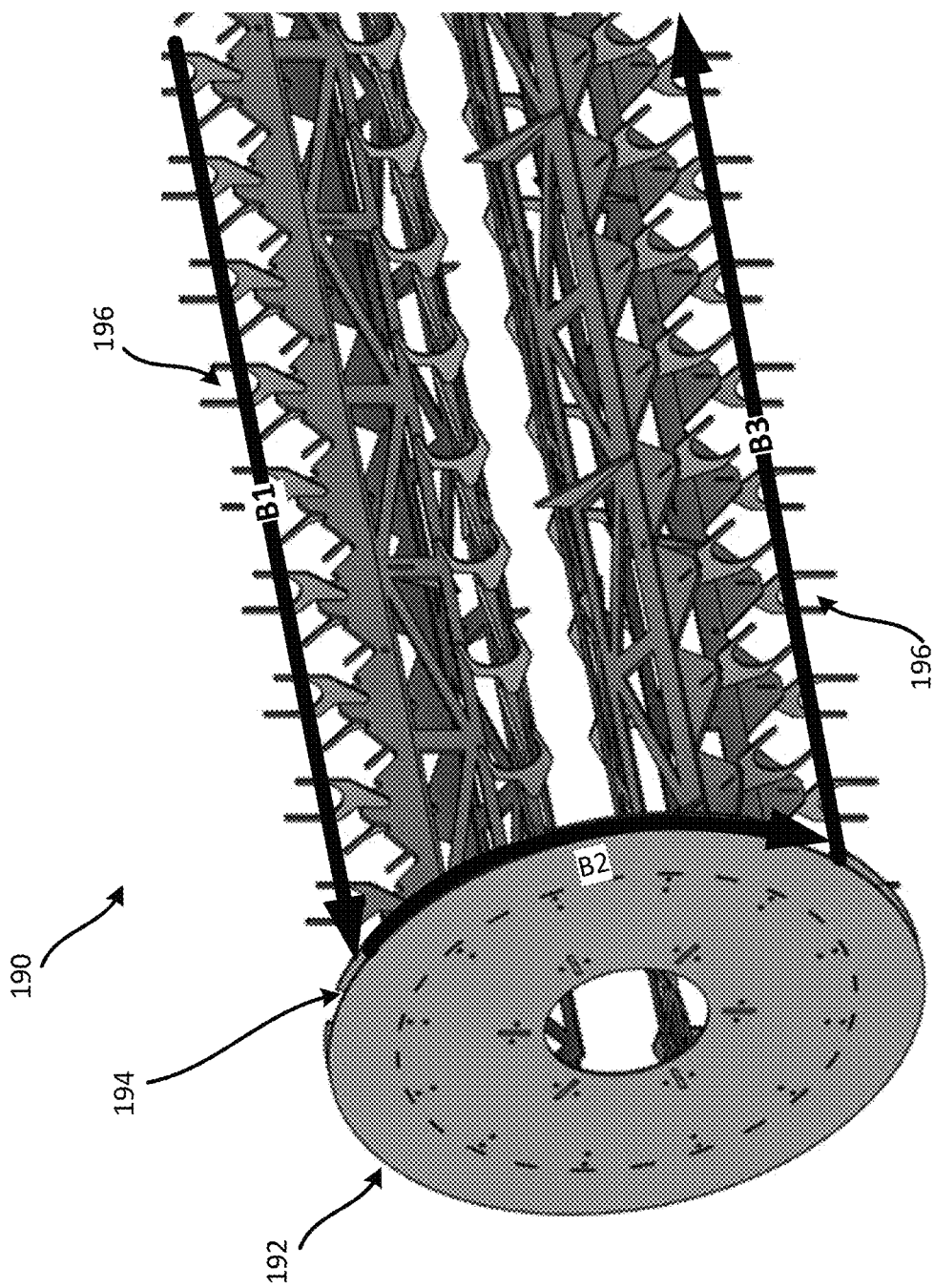
FIG. 1C schematically illustrates an in-ring winding process.

In some examples, an in-ring winding process has been performed on a manufacturing fixture to produce a 3D load bearing structure, such as the example 3D load bearing structure 100 described above, including a lattice or truss type structure, or another similar 3D load bearing structure not explicitly shown. FIG. 1C schematically illustrates a portion of the in-ring winding process, carried out on a portion of a manufacturing fixture 190. The in-ring winding process includes aligning fibers of material along a series of pins 196, in the direction of the arrow B1, to lay material for the formation of a longitudinal member of the 3D load bearing structure. Material is then wound into a groove 194 formed in a guide flange 192 at an end portion of the manufacturing fixture 190, in the direction of the arrow B2, to lay material for the formation of a band of the 3D load bearing structure. The material is then drawn out of the groove 194 and along another series of pins 196, in the direction of the arrow B3, to lay material for the formation of another longitudinal member of the 3D load bearing structure. The in-ring winding process illustrated in FIG. 1C may be repeatedly performed to build up material on the manufacturing fixture 190 to produce longitudinal members, helical structures, and bands of the 3D load bearing structure.

In some situations, it may be difficult to achieve a high enough level of tension in the material using the in-ring winding process to achieve a desired alignment of fibers of the material and/or a desired straightness in the fibers of the material. As noted above, in order to take full advantage of the properties associated with these types of materials, and achieve the significant increases in strength of the 3D load bearing structure produced, the material is to be pulled as tightly and straight as possible during winding, and maintained as straight as possible during curing. Thus, a pull-through winding method and associated manufacturing fixtures, in accordance with implementations described herein, produce load bearing members of a 3D load bearing structure that are straighter and, therefore, stronger and better able to withstand loading.

Figure 2A:
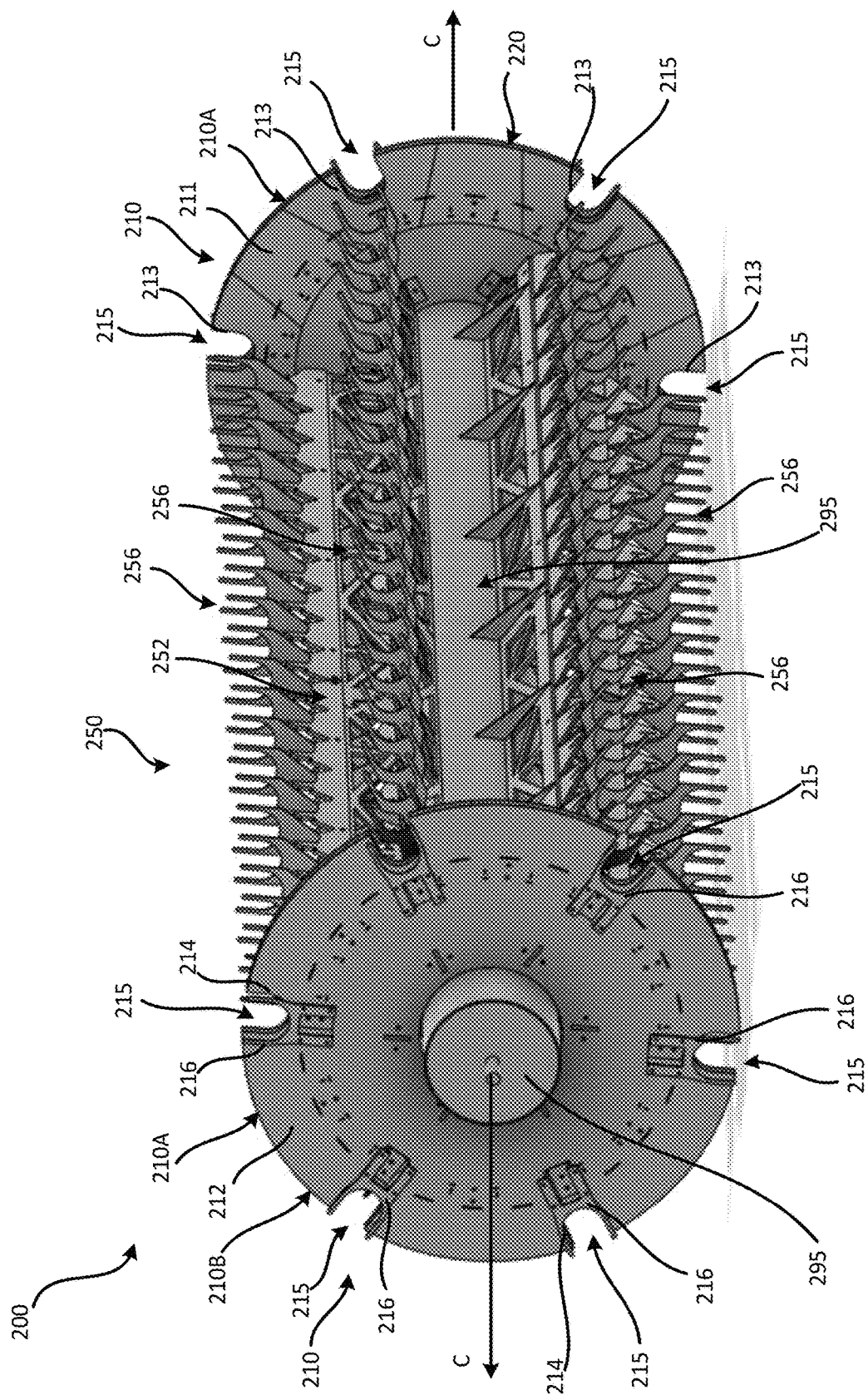
FIG. 2A is a perspective view of an example pull-through manufacturing fixture.
Figure 2B:
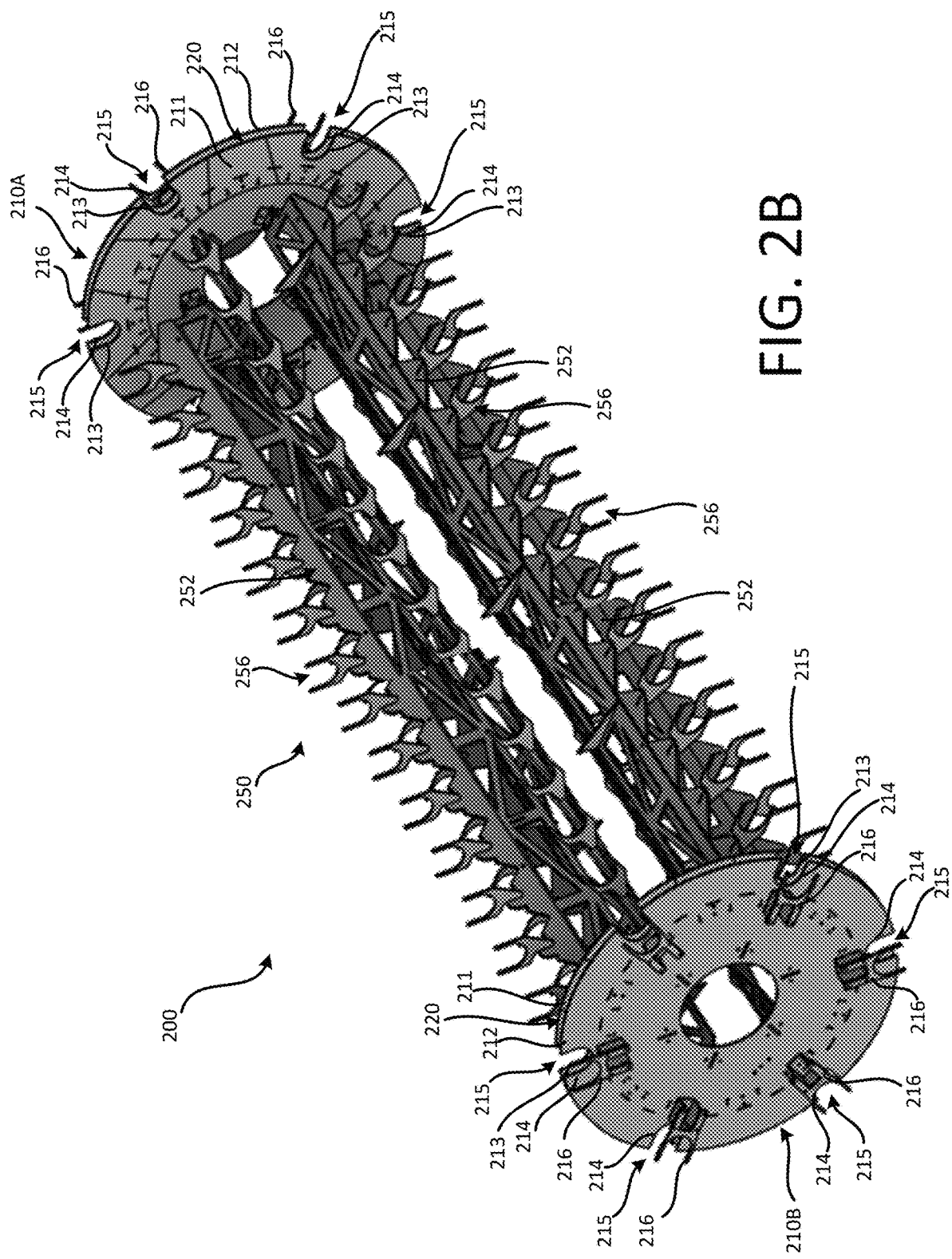
FIG. 2B is a perspective view of the example pull-through manufacturing fixture shown in FIG. 2A, with a core portion of the example pull-through manufacturing fixture removed.
Figure 2C:
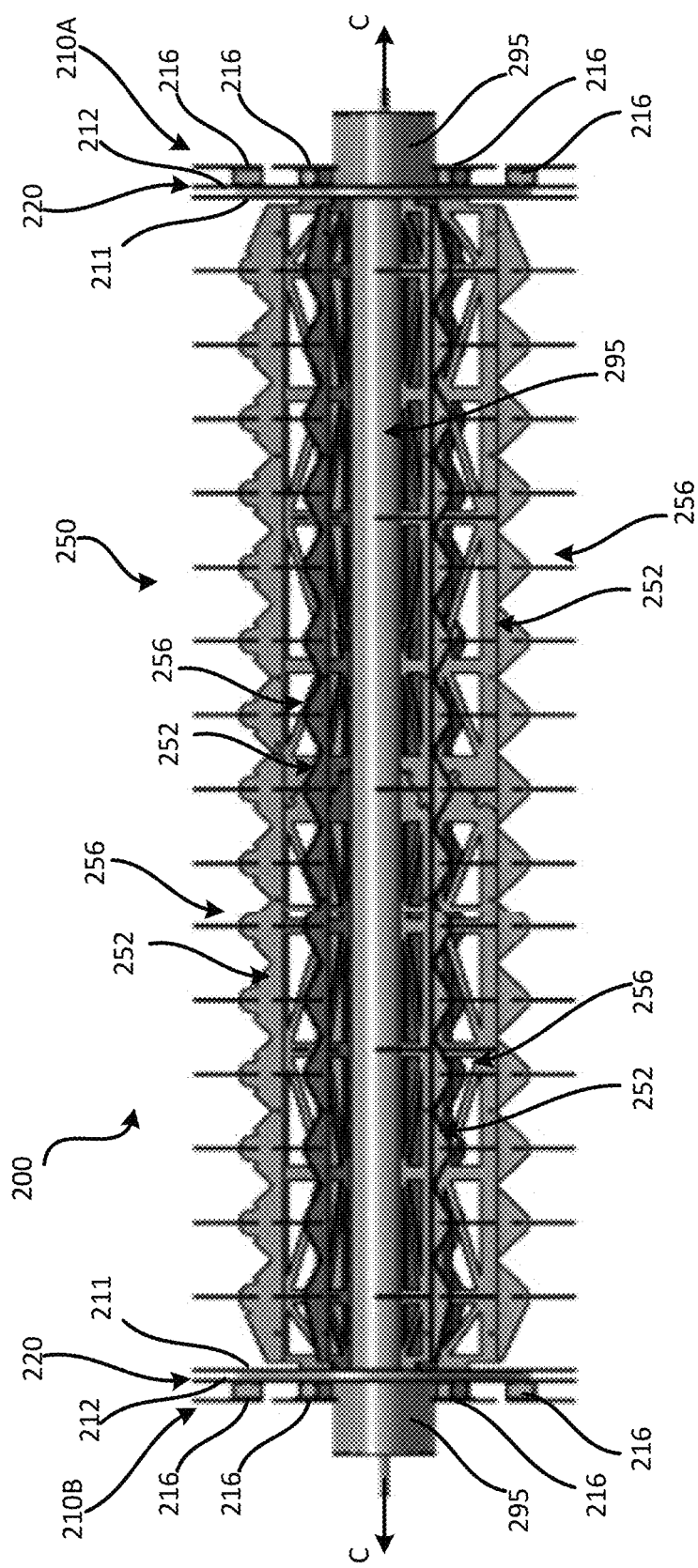
FIG. 2C is a side view of the example pull-through manufacturing fixture shown in FIGS. 2A and 2B.
Figure 2D:
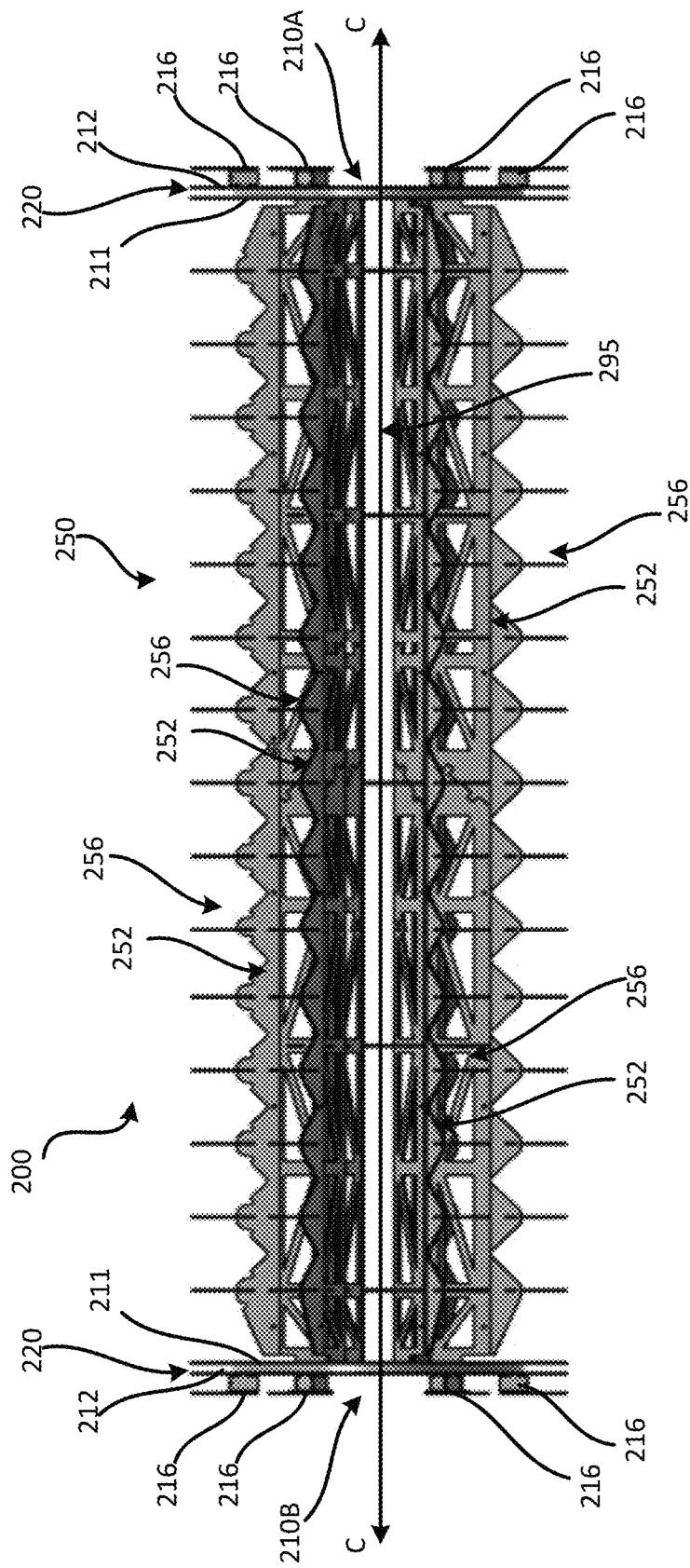
FIG. 2D is a side view of the example pull-through manufacturing fixture shown in FIGS. 2A-2C, with the core portion of the example pull-through manufacturing fixture removed.
Figure 2E:
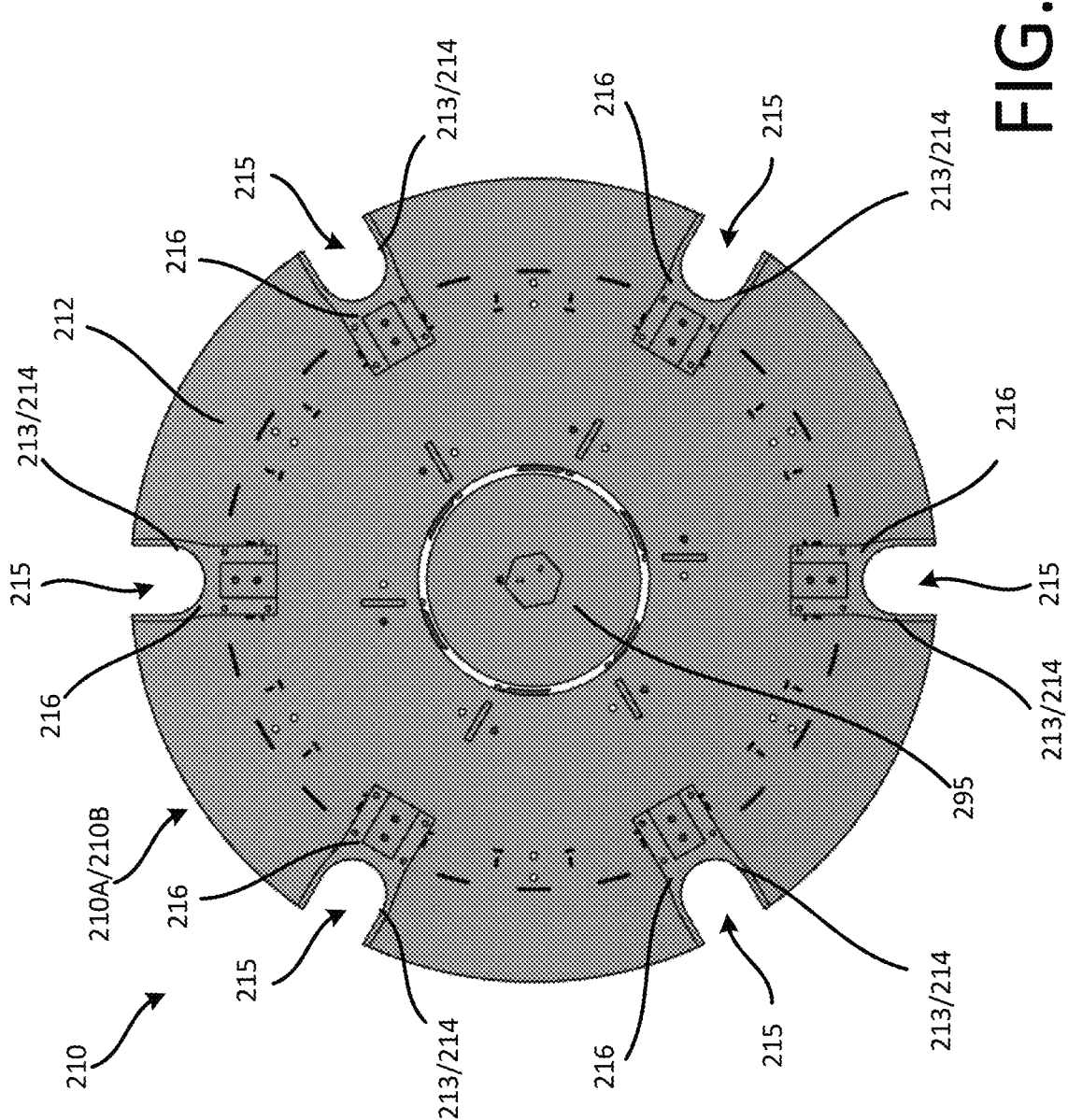
FIG. 2E is an axial end view of the example pull-through manufacturing fixture shown in FIGS. 2A-2C.

FIGS. 2A-2F illustrate an example manufacturing fixture 200, or jig, or mandrel, on which a pull-through winding process, in accordance with implementations described herein, is employed. The example manufacturing fixture 200 facilitates the layup of material, for example, carbon fiber material or other type of material, of a 3D load bearing structure, such as the example 3D load bearing structure 100 shown in FIGS. 1A and 1B having a lattice, or truss-type structure. In particular, FIGS. 2A and 2B are perspective views of the example manufacturing fixture 200. FIGS. 2C and 2D are side views of the example manufacturing fixture 200. FIG. 2E is an axial end view, and FIG. 2F is a perspective end view, of the example manufacturing fixture 200. In FIGS. 2B, 2D, and 2F, a core portion 295 of the example manufacturing fixture has been removed so that remaining features of the example manufacturing fixture 200 are more easily visible.

The example manufacturing fixture 200 shown in FIGS. 2A-2F includes an intermediate guide section 250 positioned between a pair of pull-through guide flanges 210. In particular, a first pull-through guide flange 210A is positioned at a first longitudinal end portion of the intermediate guide section 250, and a second pull-through guide flange 210B is positioned at a second longitudinal end portion of the intermediate guide section 250 of the manufacturing fixture 200. The first pull-through guide flange 210A and the second pull-through guide flange 210B are mounted on opposite end portions of a core portion 295 that extends through a central portion of the manufacturing fixture 200, along a longitudinal centerline C of the manufacturing fixture 200. The core portion 295 is mountable on a support structure (not shown in FIGS. 2A-2F) to facilitate the manipulation, or movement (for example, rotation about the central axis B) of the manufacturing fixture 200 as material is laid up on the manufacturing fixture 200.

Each of the pull-through guide flanges 210 includes an inner guide plate 211 and an outer guide plate 212. A guide groove 220 is formed between the inner guide plate 211 and the outer guide plate 212. The guide groove 220 guides the layup of material for forming a band 180 at a respective end portion of the intermediate guide section 250 of the manufacturing fixture 200. A plurality of slots 215 are formed in a peripheral portion of each guide flange 210. The plurality of slots 215 are defined by a first plurality of slots 213 formed along a peripheral portion of the inner guide plate 211, and a second plurality of slots 214 formed along a peripheral portion of the outer guide plate 212, at positions respectively corresponding to the first plurality of slots 213 formed in the inner guide plate 211. A plurality of outer hooks 216, or pins, are coupled to an outer facing side surface of the outer guide plate 212, at positions respectively corresponding to the plurality of slots 215. The plurality of outer hooks 216, or pins, are spaced apart from the outer facing surface of the outer guide plate 212. The plurality of slots 215 and the plurality of outer hooks 216, or pins, guide the layup of material, from the intermediate guide section 250 to an outside of the outer guide plate 212 for a pull through of the material, or into the guide groove 220 for layup of material of the band 180.

In the example arrangement shown in FIGS. 2A-2F, the pull-through guide flanges 210 have a substantially round, or circular shape, or peripheral contour, simply for purposes of discussion and illustration. The principles described herein are applicable to manufacturing fixtures having pull-through guide flanges having other shapes and/or peripheral contours, and/or having different interior contours to produce bands having an annular flange configuration, an annular collar configuration, a polyhedral collar configuration, and other such bands. In the example arrangement shown in FIGS. 2A-2F, six slots 215 are formed in the peripheral portion of each of the pull-through guide flanges 210, with the slots 215 arranged substantially symmetrically about a central plane of the manufacturing fixture 200, simply for purposes of discussion and illustration. The principles described herein are applicable to manufacturing fixtures having more, or fewer, slots formed in the pull-through guide flanges, arranged similarly to or differently from the example arrangement shown in FIGS. 2A-2F. In the example arrangement shown in FIGS. 2A-2F, the plurality of slots 215 have a U-shaped contour, or shape, simply for purposes of discussion and illustration. The principles described herein are applicable to manufacturing fixtures including guide slots having different shapes and/or contours. Similarly, the plurality of outer hooks 216, or pins, have a U-shaped contour, or shape, simply for purposes of discussion and illustration. The principles described herein are applicable to manufacturing fixtures including hooks, or pins, having different shapes and/or contours.

The intermediate guide section 250 includes a plurality of support members 252 extending between the first pull-through guide flange 210A to the second pull-through guide flange 210B. A plurality of guide pins 256 are coupled on each of the plurality of support members 252. In this example arrangement, the plurality of guide pins 256 have a U-shaped contour that extends outward, for example, radially outward relative to the longitudinal centerline C, from the respective support member 252. Each support member 252 (and the corresponding guide pins 256) is arranged so as to extend between a slot 215 of the plurality of slots 215 formed in the first pull-through guide flange 210A and a corresponding slot 215 formed in the second pull-through guide flange 210B, to guide material from one of the pull-through guide flanges 210, through the intermediate guide section 250, to the other of the pull-through guide flanges 210.

The example arrangement of slots 215 in the pull-through guide flanges 210, and plurality of support members 252/ guide pins 256 in the intermediate guide section 250 of the manufacturing fixture 200, is provided for purposes of discussion and illustration. These features of the example manufacturing fixture 200 can be adapted based on, for example, a number of longitudinal members to be included in the 3D load bearing structure 100 produced by the pull-through winding process on the manufacturing fixture 200, an arrangement of helical structures 130/transverse members 120 to be included in the 3D load bearing structure 100 produced by the pull-through winding process on the manufacturing fixture 200, a size and/or shape and/or configuration of the band 180 to be formed at the end portions of the resulting 3D load bearing structure 100 produced by the pull-through winding process on the manufacturing fixture 200, and the like.

Figure 3A:
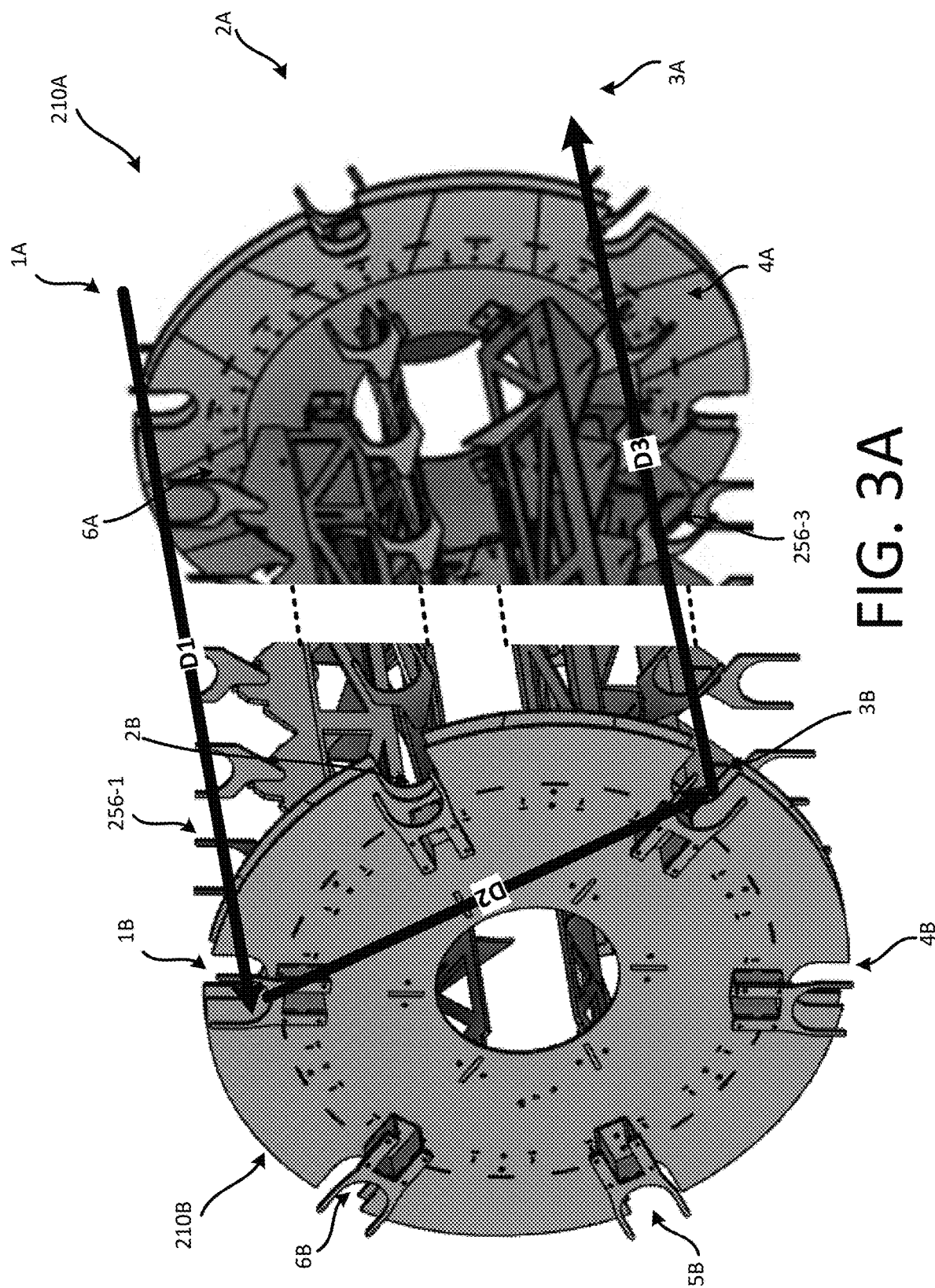
FIGS. 3A and 3B are truncated perspective views of the example pull through manufacturing fixture shown in FIGS. 2A-2F, schematically illustrating a pull-through winding of material.
Figure 3B:
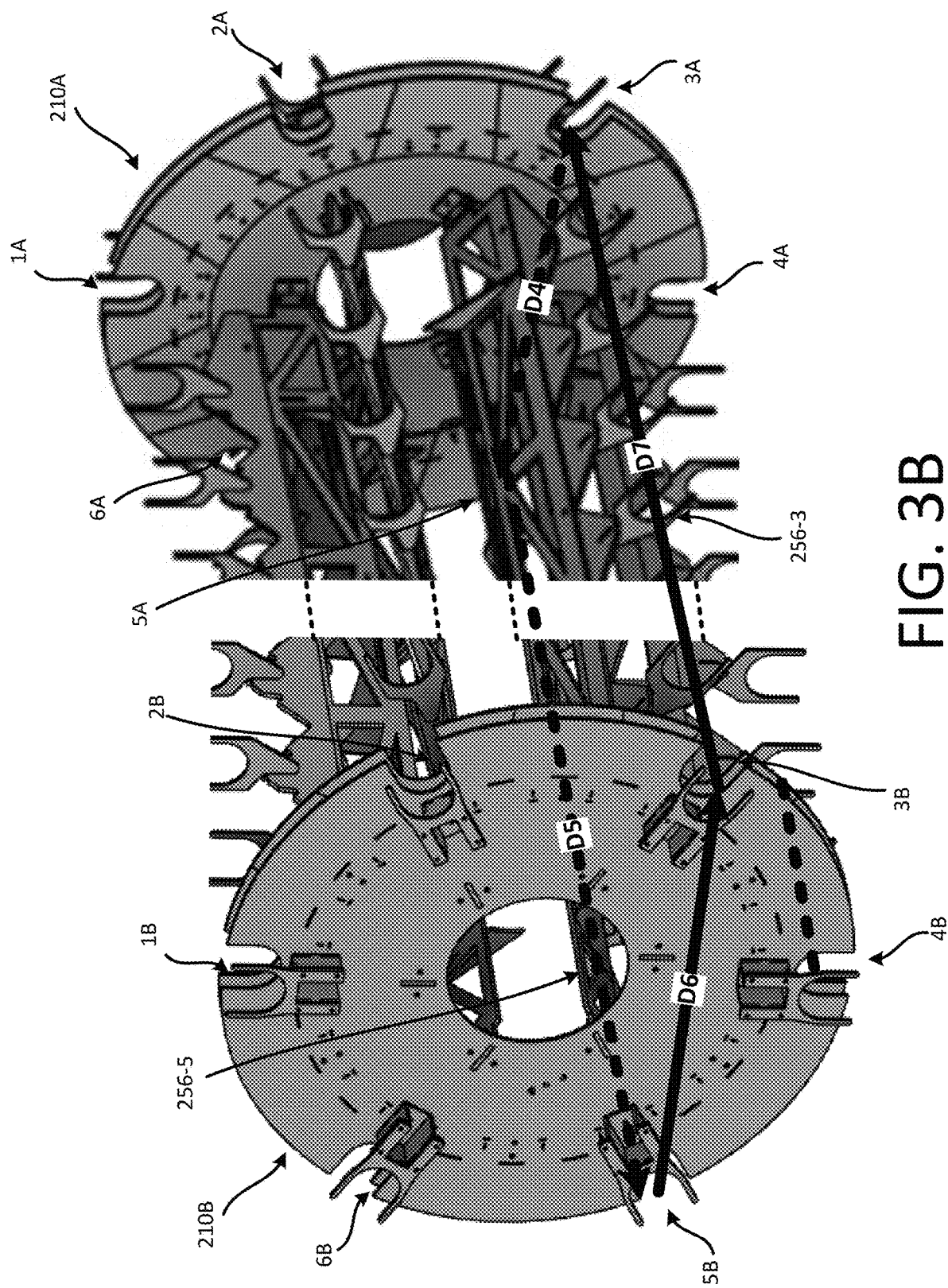

FIGS. 3A-3D schematically illustrate principles of the pull-through winding process, carried out on the example manufacturing fixture 200. FIGS. 3A and 3B are truncated perspective views in which a central portion of the manufacturing fixture 200 has been omitted, so that the winding pattern at the pull-through guide flanges 210 is more easily visible. In FIGS. 3A and 3B, the slots 215 of the first pull-through guide flange 210A are labeled as slots 1A through 6A, and the slots 215 of the second pull-through guide flange 210B are labeled 1B through 6B, to facilitate description of the pull-through winding process.

As shown in FIG. 3A, the pull-through winding process includes aligning fibers of material along a first plurality of guide pins 256-1, in the direction of the arrow D1, from the slot 1A of the first pull-through guide flange 210A to the slot 1B of the second pull-through guide flange 210B, to lay material for the formation of a first longitudinal member of the 3D load bearing structure 100. The material is pulled through the slot 1B, and beyond a corresponding outer hook 216 of the plurality of outer hooks 216, to an outside of outer guide plate 212 of the second pull-through guide flange 210B. The pulling of the material through the slot 1B and the corresponding outer hook 216, to the outside of the second pull-through guide flange 210B, allows a high enough level of tension to be achieved in the material so that the fibers of the material are aligned in a straight line, or a desired level of straightness in the fibers of the material is achieved. This, in turn, produces a longitudinal member 110 having straight, aligned fibers, thus taking advantage of the properties of the composite material and achieving desired strength levels.

In this example, material is then pulled, in the direction of the arrow D2, from the outside of outer hook 216 corresponding to the slot 1B, toward the outside of an outer hook 216 corresponding slot 3B of the second pull-through guide flange 210B. In this example arrangement, the material is pulled from the slot 1B/outer hook 216, across the outside of the second pull-through guide flange 210B, past the core portion 295 (not shown in FIG. 3A) to the outer hook 216/slot 3B of the second pull-through guide flange 210B. This continued pulling allows tension to be maintained in the material laid in the first plurality of guide pins 256-1, for formation of the first longitudinal member 110.

Material is then pulled, in the direction of the arrow D3, from the outside of the second pull-through guide flange 210B, through the outer hook 216/slot 3B, and along a plurality of guide pins 256-3 (extending between the slot 3B and the slot 3A), to lay material for the formation of another longitudinal member of the 3D load bearing structure 100. Again, the pulling of the material through the slot 3B/corresponding outer hook 216, along the plurality of guide pins 256-3, and through the slot 3A/corresponding outer hook 216 to the outside of the first pull-through guide flange 210A, allows a high enough level of tension to be achieved in the material so that the fibers of the material are aligned in a straight line, or a desired level of straightness in the fibers of the material is achieved. This, in turn, produces a longitudinal member 110 having straight, aligned fibers, thus taking advantage of the properties of the composite material and achieving desired strength levels.

As shown in FIG. 3B, the layup of material continues, as material is pulled, in the direction of the arrow D4, from the outside of outer hook 216 corresponding to the slot 3A, toward the outside of an outer hook 216 corresponding slot 5A of the first pull-through guide flange 210A. In this example arrangement, the material is pulled from the slot 3A/outer hook 216, across the outside of the first pull-through guide flange 210A, past the core portion 295 (not shown in FIG. 3B) to the outer hook 216/slot 5A of the first pull-through guide flange 210A. This continued pulling allows tension to be maintained in the material that has been laid in the plurality of guide pins 256-1, and the plurality of guide pins 256-3, for the formation of the corresponding longitudinal members 110.

The material is pulled through the outer hook/slot 5A of the first pull-through guide flange 210A, aligning fibers of the material along a plurality of guide pins 256-5, in the direction of the arrow D5, from the slot 5A of the first pull-through guide flange 210A to the slot 5B of the second pull-through guide flange 210B, to lay material for the formation of another longitudinal member of the 3D load bearing structure 100. The material is pulled through the slot 5B, and beyond a corresponding outer hook 216, to an outside of outer guide plate 212 of the second pull-through guide flange 210B. The pulling of the material through the slot 5B and the corresponding outer hook 216, to the outside of the second pull-through guide flange 210B, allows a high enough level of tension to be achieved in the material so that the fibers of the material are aligned in a straight line, or a desired level of straightness in the fibers of the material is achieved. This, in turn, produces a longitudinal member 110 having straight, aligned fibers, thus taking advantage of the properties of the composite material and achieving desired strength levels.

In this example, material is then pulled, in the direction of the arrow D6, from the outside of outer hook 216 corresponding to the slot 5B, toward the outside of an outer hook 216 corresponding slot 3B of the second pull-through guide flange 210B. In this example arrangement, the material is pulled from the slot 5B/outer hook 216, across the outside of the second pull-through guide flange 210B, past the core portion 295 (not shown in FIG. 3B) to the outer hook 216/slot 3B of the second pull-through guide flange 210B. This continued pulling allows tension to be maintained in the material laid in the various plurality of guide pins 256 in which material has been laid for the formation of the longitudinal members 110.

Material is then pulled, in the direction of the arrow D7, from the outside of the second pull-through guide flange 210B, through the outer hook 216/slot 3B, and along the plurality of guide pins 256-3 (extending between the slot 3B and the slot 3A), to lay more material for the formation of the corresponding longitudinal member 110. Again, the pulling of the material through the slot 3B/corresponding outer hook 216, along the plurality of guide pins 256-3, and through the slot 3A/corresponding outer hook 216 to the outside of the first pull-through guide flange 210A, allows a high enough level of tension to be achieved in the material so that the fibers of the material are aligned in a straight line, or a desired level of straightness in the fibers of the material is achieved. This, in turn, produces a longitudinal member 110 having straight, aligned fibers, thus taking advantage of the properties of the composite material and achieving desired strength levels.

In some examples, this type of process may be repeated for a set number of cycles. Material may then be guided through the guide groove 220 of one of the pull-through guide flanges 210, to initiate winding of other longitudinal members 110 and/or helical structures 130 of the 3D load bearing structure 100 on the manufacturing fixture 200. That is, this type of pull-through winding and layup of material can continue, alternating with drawing the material fibers along the plurality of guide pins 256 and through the respective slots 215 and outer hooks, until the required level of material is built up in the guide pins 256 for formation of the longitudinal members 110, and in the grooves 220 for the formation of the bands 180 of the 3D load bearing structure 100. One example process will be described in more detail below with respect to FIG. 4.

Figure 3C:
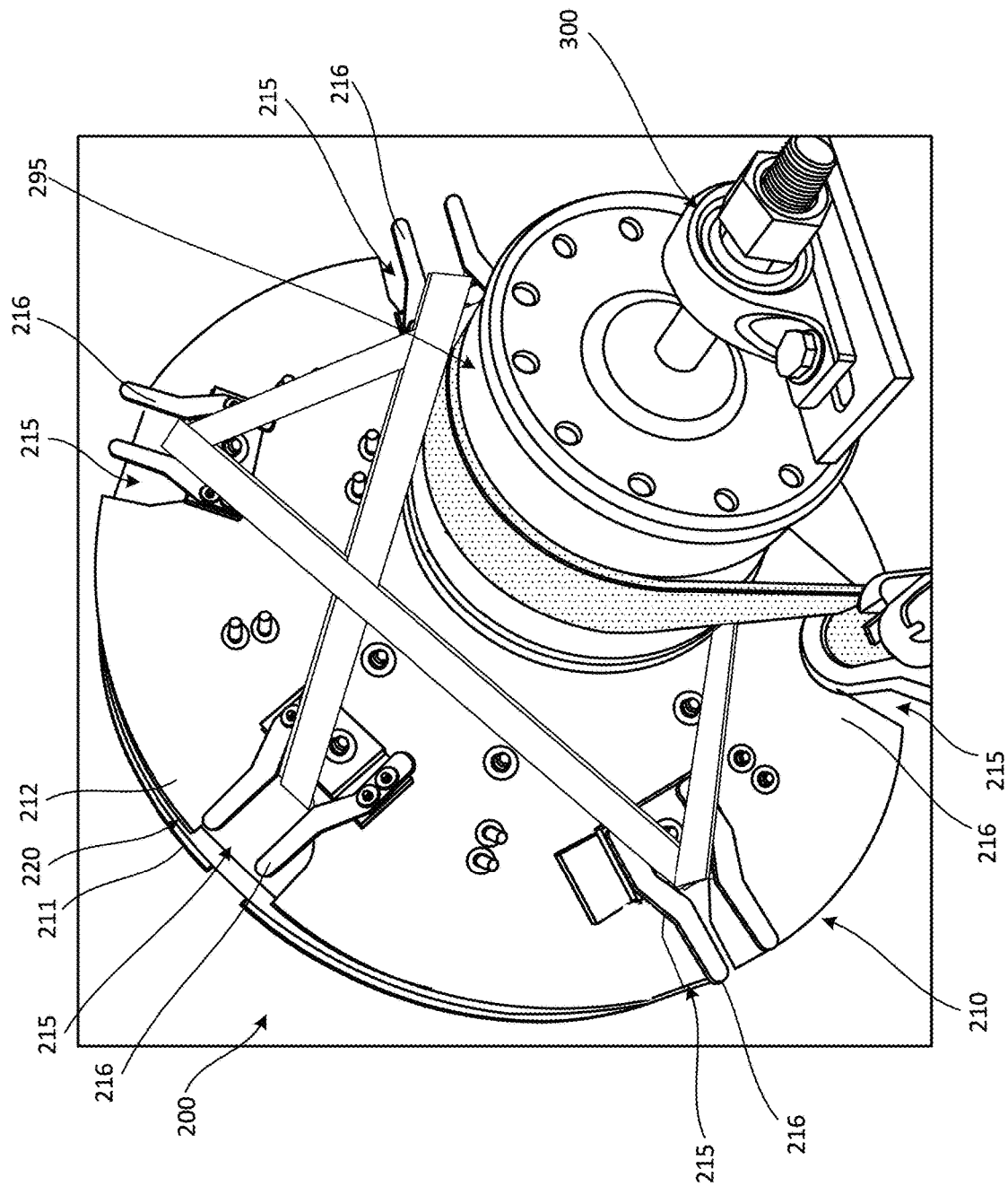
FIG. 3C is an end view of the example pull through manufacturing fixture shown in FIGS. 2A-2F, illustrating a lay-up of material at the end portion of the example pull-through manufacturing fixture.
Figure 3D:
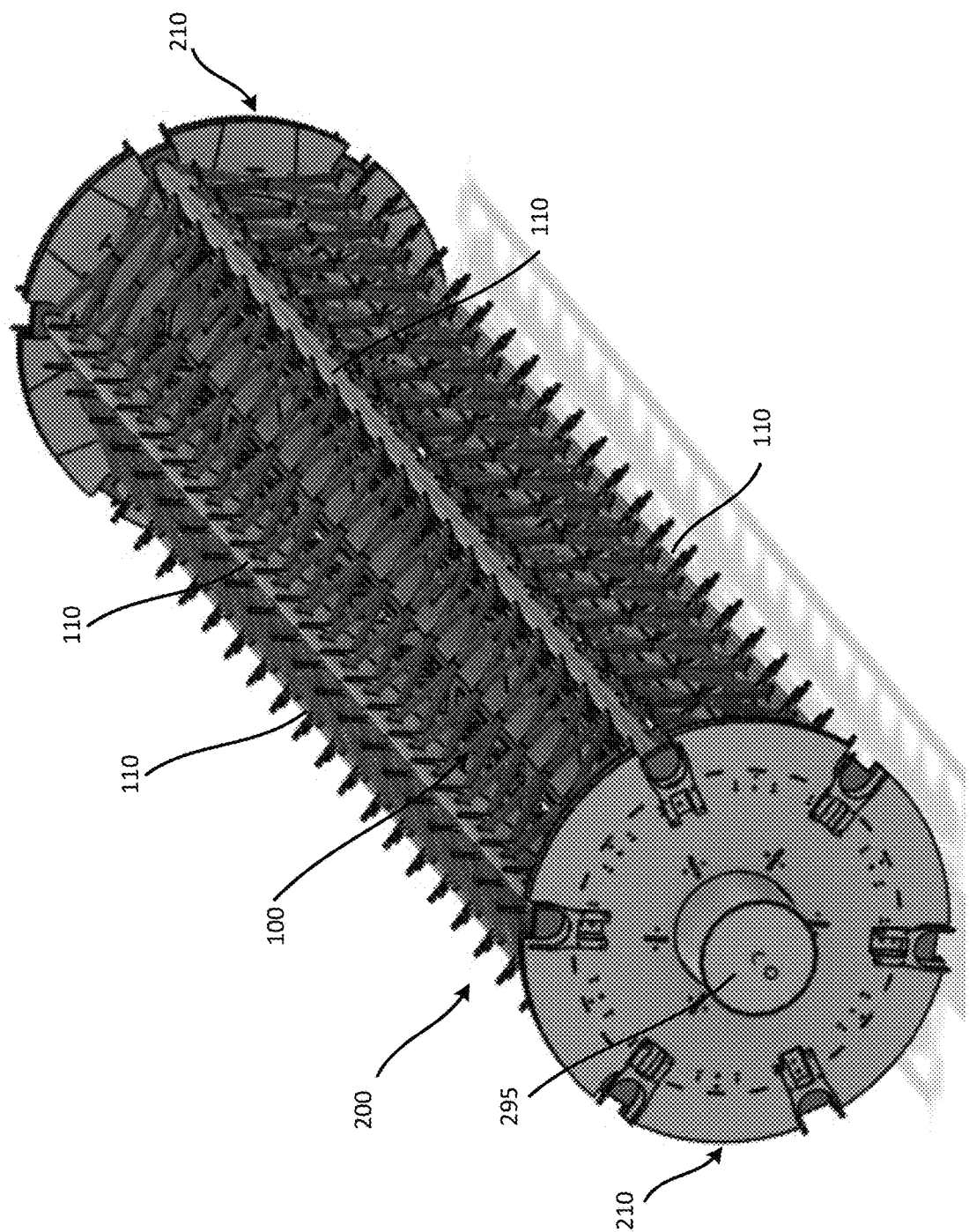
FIG. 3D is a perspective view illustrating an example three-dimensional load bearing structure on the example pull-through manufacturing fixture.

FIG. 3C is an end view, illustrating one of the pull-through guide flanges 210, having material, for example, carbon fiber material, or another material, wound through the plurality of slots 215, plurality of outer hooks 216, and grooves 220, as described above, to produce the example 3D load bearing structure 100. FIG. 3C illustrates the manufacturing fixture 200, with the core portion 295 mounted on and rotatably coupled to an example support fixture 300. In some examples, the mounting of the manufacturing fixture 200 on the example support fixture 300 in this manner can facilitate the rotation of the manufacturing fixture 200 as the material is laid up on the manufacturing fixture 200, can facilitate the movement of the manufacturing fixture 200 within a fabrication facility, and the like. FIG. 3D is a perspective view, illustrating a completed 3D load bearing structure 100 on the example manufacturing fixture 200. As noted above, the plurality of outer hooks 216 are spaced apart from the outer surface of the outer guide plate 212 and corresponding plurality of slots 215. This spacing allows the material accumulated at the outside of the outer guide plate 212 to be cut away, and removed from the end portion of the 3D load bearing structure 100 once the compacting, heating/curing and hardening of the material on the manufacturing fixture 200 is complete and fabrication of the 3D load bearing structure 100 is complete.

Figure 4:
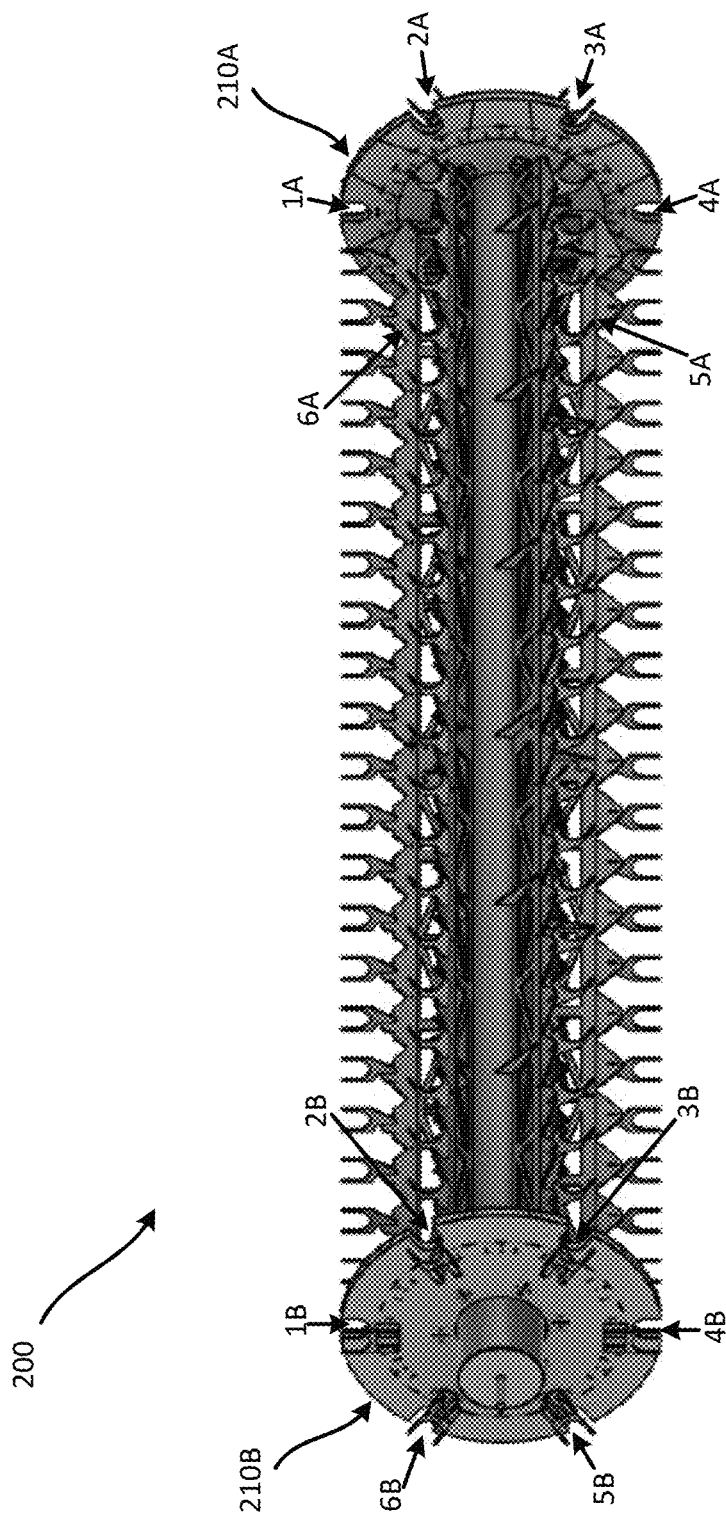
FIG. 4 is a side perspective view of the example pull-through manufacturing fixture shown in FIGS. 2A-2F.

An example pull-through winding process will be described, with respect to FIG. 4 and the example manufacturing fixture 200 described above. The example pull-through winding process can be used to produce a 3D load bearing structure, such as the example 3D load bearing structure 100 described above, having a lattice or truss type structure. The pull-through winding pattern to be described is provided simply for purposes of discussion and illustration. The principles described herein can be applied to other winding patterns, for the production of 3D load bearing structures being configured similarly to or differently from the example 3D load bearing structure 100 described above, having six longitudinal members 110. That is, as the pull-through guide flanges 210 of the example manufacturing fixture 200 each include six slots 215, the example pull-through winding pattern applied to the example manufacturing fixture 200 will produce the 3D load bearing structure 100 including six longitudinal members 110, with six-sided, or hexagonal, helical structures 130, simply for purposes of discussion and illustration.

In some examples, the example pull through winding process includes a longitudinal winding pattern that provides a layup of material for the longitudinal members 110. The example longitudinal winding pattern may include a pull through of material from slot 2A to slot 2B, and across the outside of the second pull-through guide flange 210B to slot 5B. The material is then pulled through slot 5B to slot 5A, and through slot 5A and across the outside of the first pull-through guide flange 210A to slot 1A. The material is then pulled through slot 1A to slot 1B, and through slot 1B and across the outside of the second pull-through guide flange 210B to slot 4B. The material is then pulled through slot 4B to slot 4A, and through slot 4A and across the outside of the first pull-through guide flange 210A to slot 6A. The material is then pulled through slot 6A to slot 6B, and through slot 6B and across the outside of the second pull-through guide flange 210B to slot 3B. The material is then pulled through slot 3B to slot 3A, and through slot 3A. At this point in the winding pattern, material has been laid in each of the plurality of guide pins 256 extending between the corresponding slots 215 in the first and second pull-through guide flanges, for the formation of the six longitudinal members 110. At this point, the material can be pulled into the groove 220 of the first pull-through guide flange 210A, wound in the groove 220/around the core portion 295, and pulled out through slot 2A. In some examples, a similar pattern can be repeated, beginning at slot 2A, for the layup of additional material in the formation of the longitudinal members 110.

In some examples, the example pull-through winding process includes a pattern alternating the layup of materials for formation of the longitudinal members 110 with a layup of materials in the grooves 220 of the pull-through guide flanges 210, for formation of the bands 180 of the 3D load bearing structure 100. An example of the alternating pattern can include, for example, pulling material through the slot 2B (for example, at completion of the layup of material for the longitudinal members 110 as described above) and into the groove 220, and winding the material in the groove 220 to the slot 1B. Material may then be pulled from the groove 220 through the slot 1B to the outside of the second pull-through guide flange 210B, and across to the slot 4B. Material is then pulled through the slot 4B into the groove 220, to the slot 5B. From the slot 5B, material is pulled across the plurality of guide pins 256 to the slot 5A in the first pull-through guide flange 210A for the layup of additional material for the corresponding longitudinal member 110. From the slot 5A, material may be pulled into the groove 220 in the first pull-through guide flange 210A to the slot 6A, and from the slot 6A across the outside of the first pull through guide flange 210A to the slot 2A. The material may then be pulled into the groove 220 through the slot 2A and back out of the groove 220 through the slot 1A. From the slot 1A, material is pulled across the plurality of guide pins 256 to the slot 1B in the second pull-through guide flange 210B for the layup of additional material for the corresponding longitudinal member 110. A similar pattern may be employed to alternate the layup of materials for the remaining longitudinal members 110 and the bands 180 formed by the first pull-through guide flange 210A and the second pull-through guide flange 210B.

In some examples, the example pull-through winding process includes a helical pattern for the layup of materials for the formation of helical structures 130 that is carried out as material is wrapped around the example manufacturing fixture 200, between the first pull-through guide flange 210A and the second pull-through guide flange 210B. An example of helical pattern can include, for example, pulling material through the slot 2A (for example, at completion of the layup of material for the longitudinal members 110 as described above) into the groove 220 in the first pull-through guide flange 210A, to the slot 1A. From the slot 1A, the material may be pulled, and wrapped around a circumference of the manufacturing fixture 200 to the slot 5B. In some examples, manipulation of the support fixture 300 may provide for rotation of the manufacturing fixture 200, to facilitate the winding or wrapping of the material around the circumference of the manufacturing fixture, from the slot 1A in the first pull-through guide flange 210A to the slot 5B in the second pull-through guide flange 210B and into the groove 220 in the second pull-through guide flange 210B. The material may be pulled in the groove 220, from the slot 5B to the slot 4B, and then from the slot 4B to the slot 2A in the first pull-through guide flange 210A. Again, the material may be wound, or wrapped around the circumference of the manufacturing fixture 200 in pulling the material from the slot 4B in the second pull-through guide flange 210B to the slot 2A in the first pull-through guide flange 210A. The material is pulled into the groove 220 in the first pull-through guide flange 210A from the slot 2A, and pulled out of the groove 220 through the slot 6A (bypassing the slot 1A) in the first pull-through guide flange 210A. Material is then pulled from the slot 6A, wound or wrapped around the manufacturing fixture 200, and pulled into the groove 220 in the second pull-through guide flange 210B through the slot 4B. Material is pulled in the groove 220, from the slot 4B and out through the slot 3B in the second pull-through guide flange 210B. From the slot 3B, the material is, again, wound or wrapped around the manufacturing fixture 200, and pulled into the groove 220 in the first pull-through guide flange 210A through the slot 1A. The material is then wound in the groove 220 in the first pull-through guide flange 210A, in through the slot 1A and out through the slot 5A (bypassing the slot 6A). From the slot 5A, the material is once again wound around the manufacturing fixture 200 and pulled into the groove 220 in the second pull-through guide flange 210B through the slot 3B. This process continues, with the material pulled into the groove 220 through the slot 3B and out through the slot 2B, and pulled/wound to the slot 6A. The material is wound in the groove from the slot 6A to the slot 4A (bypassing the slot 5A), and pulled from the slot 4A to the slot 2B. The material is pulled into the groove 220 through the slot 2B and out through the slot 1B, and pulled/wound to the slot 5A. The material is wound in the groove from the slot 5A to the slot 3A (bypassing the slot 4A), and pulled from the slot 3A to the slot 1B. The material is pulled into the groove 220 through the slot 1B and out through the slot 6B, and pulled/wound to the slot 4A. The material is wound in the groove from the slot 4A to the slot 2A (bypassing the slot 3A), and pulled/wound to the slot 6B. The material is pulled into the groove 220 through the slot 6B, and a winding is completed in the groove 220 of the second pull-through guide flange 210B, bypassing slots 5B, 4B, 3B, 2B, 1B, and 6B. The material is pulled out of the groove 220 through the slot 5B, and pulled/wound around the manufacturing fixture to the slot 3A, where a winding can be completed in the groove 220 of the first pull-through guide flange 210A.

In some examples, a pull-through system and method for fabricating a 3D load bearing structure, such as the example 3D load bearing structure 100 described above, may include a combination of the longitudinal winding pattern, the alternating longitudinal and band winding pattern, and the helical winding pattern. In some examples, the pull-through winding method may begin with a set number of initial wraps of material in the grooves 220 of each of the pull-through guide flanges 210. In some examples, the set number of initial wraps may be based on, for example, a size and/or shape and/or contour of the bands 180 to be fabricated, a type of material being wound in the grooves 220 of the pull-through guide flanges 210, a support structure and/or adjacent 3D load bearing structure to which the band(s) 180 are to be coupled, and other such factors. In some examples, 100 wraps of material are wound in the groove 220 of each of the pull-through guide flanges 210. In some examples, the initial number of wraps is greater than, or less than, 100.

In some examples, a set number of cycles of the helical winding pattern may be performed. In some examples, the set number of cycles of the helical winding pattern may be performed following the winding of the set number of wraps of material in the grooves 220 of the pull-through guide flanges 210. In some examples, the set number of cycles of the helical winding pattern may be based on, for example, a size and/or shape and/or contour of the 3D load bearing structure 100 to be produced, loads to be borne by the resulting 3D load bearing structure 100, a type of material from which the 3D load bearing structure 100 is produced, and other such factors. In some examples, 5 cycles of the helical winding pattern are performed. In some examples, more, or fewer than 5 cycles of the helical winding pattern are performed.

In some examples, a set number of cycles of the longitudinal winding pattern may be performed. In some examples, the set number of cycles of the longitudinal winding pattern may be performed following the winding of the set number of cycles of the helical winding pattern. In some examples, the set number of cycles of the longitudinal winding pattern may be based on, for example, a size and/or shape and/or contour of the 3D load bearing structure 100 to be produced, loads to be borne by the resulting 3D load bearing structure 100, a type of material from which the 3D load bearing structure 100 is produced, and other such factors. In some examples, 28 cycles of the longitudinal winding pattern are performed. In some examples, more, or fewer than 28 cycles of the longitudinal winding pattern are performed.

In some examples, another set number of cycles of the helical winding pattern may be performed, following the winding of the set number of cycles of the longitudinal winding pattern. This may provide for interweaving at the nodes 150, integrally coupling the resulting helical structures 130 to the resulting longitudinal members 110. In some examples, the set number of cycles of the helical winding pattern may be, again, based on, for example, a size and/or shape and/or contour of the 3D load bearing structure 100 to be produced, loads to be borne by the resulting 3D load bearing structure 100, a type of material from which the 3D load bearing structure 100 is produced, and other such factors. In some examples, 5 additional cycles of the helical winding pattern are performed. In some examples, more, or fewer than 5 additional cycles of the helical winding pattern are performed In some examples, a set number of additional wraps of material may be laid in the grooves 220 of each of the pull-through guide flanges 210. In some examples, this may provide for the integral formation, or integral coupling of the resulting bands 180 with the longitudinal members 110 and the helical structures 130. In some examples, the set number of additional wraps may be based, again, on, for example, a size and/or shape and/or contour of the bands 180 to be fabricated, a type of material being wound in the grooves 220 of the pull-through guide flanges 210, a support structure and/or adjacent 3D load bearing structure to which the band(s) 180 are to be coupled, and other such factors. In some examples, 50 additional wraps of material are wound in the groove 220 of each of the pull-through guide flanges 210. In some examples, the additional number of wraps is greater than, or less than, 50.

In some examples, a compacting process is performed after the winding of material is completed. In some examples, the compacting process compacts the material received in the grooves 220 of the pull-through guide flanges 210 to eliminate voids prior to curing and hardening for the formation of the bands 180. In some examples, the compacting process compacts the material received in the plurality of guide pins 256, to eliminate voids prior to curing and hardening for the formation of the longitudinal members 110 and the helical structures 130.

In some examples, a finishing process is performed after curing and hardening the material on the manufacturing fixture 200 to produce the 3D load bearing structure 100. In some examples, the finishing process includes separating the excess material accumulated at the outsides of the pull-through guide flanges 210 from the bands 180. This includes, for example, cutting the material in the space formed between each of the plurality of outer hooks 216 and the corresponding plurality of slots 215, to separate the accumulated, excess material (due to the pull through of the material through the slots 215) from the finished bands 180. In some examples, the portions of the bands 180 from which the accumulate/excess material has been cut is machined to provide a finished surface.

Figure 5:
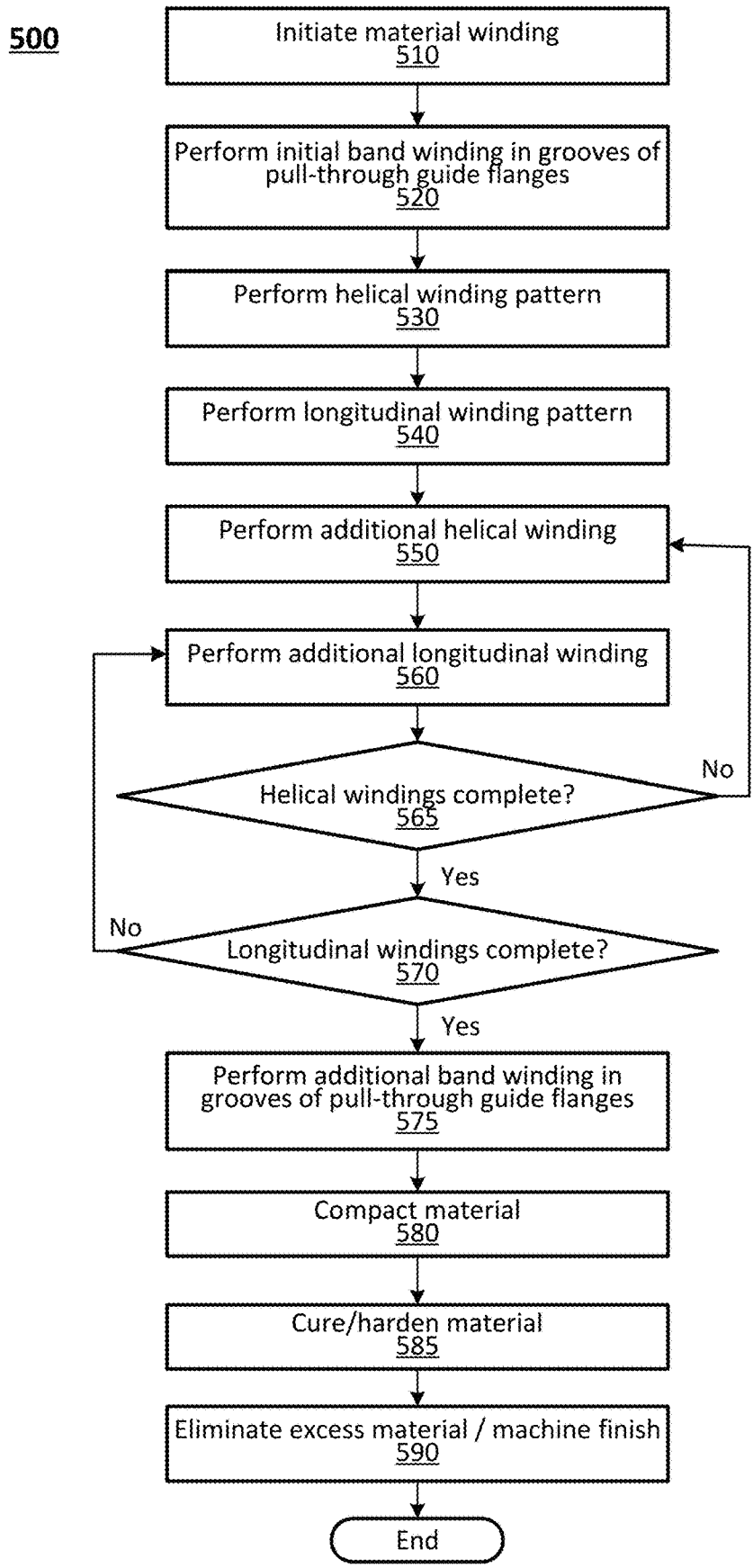
FIG. 5 is a flowchart of an example method.

FIG. 5 is a flowchart of an example method 500, in accordance with implementations described herein. The example method 500 describes a pull-though winding method, performed on a pull-through manufacturing fixture, such as the example manufacturing fixture 200 described above, for the fabrication of a 3D load bearing structure, such as the example 3D load bearing structure 100 described above, including a lattice or truss type structure. In the example method, a material winding process is initiated (block 510), and an initial band winding process is performed (block 520). The initial band winding process may include an initial winding of material in the grooves of the pull-through guide flanges 210 of the example manufacturing fixture 200, to lay in base material for the formation of the bands 180 of the example 3D load bearing structure 100. A helical winding pattern may then be performed (block 530). The performing of the helical winding pattern may be performed as described above to lay in material for the formation of the helical structures 130 of the 3D load bearing structure 100. A longitudinal winding pattern may then be performed (block 540). The performing of the longitudinal winding pattern may be performed as described above to lay in material for the formation of the longitudinal members 110 of the 3D load bearing structure 100. Additional helical winding may be performed (block 550), to lay in additional material for the formation of the helical structures 130, and additional longitudinal winding may be performed (block 560), to lay additional material in for the formation of the longitudinal members 110. The alternating performance of the helical winding pattern and the longitudinal winding pattern may provide for interweaving of the material at the nodes 150 of the 3D load bearing structure 100, thus integrally coupling the longitudinal members 110 and the helical structures 130, and producing an integrally formed 3D load bearing structure 100.

In response to a determination that a set number of cycles of the helical winding process has been completed (block 565) and that a set number of cycles of the longitudinal winding process has been completed (block 570), additional material is wound in the grooves 220 of the pull-through guide flanges 210 of the manufacturing fixture 200 (block 575), for completion of the bands 180, and integral coupling and formation of the bands 180 with the longitudinal members 110 and helical structures 130. When the lay-in of material on the manufacturing fixture is complete, the material is compacted (block 580) to eliminate voids in the material. The material is then cured, and hardened (block 585). Excess material, accumulated at the outsides of the pull-through guide flanges 210 is separated from the cured/hardened material on the manufacturing fixture, and corresponding surfaces of the resulting bands 180 are machined to provide a finished surface (block 590).

The performing of the helical winding pattern and the performing of the longitudinal winding pattern may employ the pull-through methods described above, thus allowing tension to be maintained in the material as the material is wound in the manufacturing fixture, and maintaining a straight alignment of the fibers of the material during the winding processes. Maintaining of the straight alignment of the fibers of the material during the winding processes, and into the curing and hardening processes, produces straight longitudinal members 110 and transverse members 120 defining the helical structures 130, thus producing a 3D load bearing structure 100 having increased strength, durability and reliability.

It will be understood that, in the foregoing description, when an element, such as a layer, a region, a substrate, or component is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element or layer, there are no intervening elements or layers present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A manufacturing fixture, comprising:
 a first guide flange;
 a second guide flange; and
 an intermediate guide section between the first guide flange and the second guide flange, wherein at least one of the first guide flange or the second guide flange includes:
  an inner plate including a first plurality of slots formed in a peripheral portion of the inner plate;
  an outer plate including a second plurality of slots formed in a peripheral portion of the outer plate, at positions respectively corresponding to the first plurality of slots formed in the inner plate; and
  a groove defined between the inner plate and the outer plate, and the intermediate guide section includes:
  a plurality of support members extending between the first guide flange and the second guide flange; and a plurality of guide pins coupled on each of the plurality of support members.

2. The manufacturing fixture of claim 1, wherein the plurality of support members are oriented in parallel with a longitudinal centerline of the manufacturing fixture; and
 the plurality of guide pins extend radially outward from the plurality of support members.

3. The manufacturing fixture of claim 2, wherein the plurality of guide pins is configured to guide a pulling of material from an outside of one the first guide flange or the second guide flange, between the slot of the first guide flange and the corresponding slot of the second guide flange.

4. The manufacturing fixture of claim 3, wherein the plurality of guide pins are configured to guide a pulling of material from an outside of one the first guide flange or the second guide flange, between the slot of the first guide flange and the corresponding slot of the second guide flange.

5. The manufacturing fixture of claim 1, further comprising a plurality of hooks coupled to an outward facing surface of the outer plate, at positions respectively corresponding to the first plurality of slots formed in the inner plate and the second plurality of slots formed in the outer plate.

6. The manufacturing fixture of claim 5, wherein the plurality of hooks are spaced apart from the outward facing surface of the outer plate, so as to guide material between one of the second plurality of slots of the outer plate and another of the second plurality of slots of the outer plate, along the outward facing surface of the outer plate.

7. The manufacturing fixture of claim 1, further comprising a core portion extending through a central portion of the manufacturing fixture, aligned with a central longitudinal axis of the manufacturing fixture, wherein the core portion is configured to be coupled to a support fixture that provides for rotation of the manufacturing fixture about the central longitudinal axis.

8. The manufacturing fixture of claim 1, wherein the plurality of support members and the plurality of guide pins are positioned so as to correspond to a plurality of longitudinal members of a three-dimensional load bearing structure.

9. The manufacturing fixture of claim 1, wherein a contour of the groove formed in the at least one of the first guide flange or the second guide flange corresponds to an axial band of a three-dimensional load bearing structure.

10. The manufacturing fixture of claim 1, wherein at least one of the first guide flange or the second guide flange is configured to receive a plurality of windings of material into and out of the groove via the first plurality of slots and the second plurality of slots.

\* \* \* \* \*